United States Patent
Klopp et al.

(10) Patent No.: US 12,485,149 B2
(45) Date of Patent: Dec. 2, 2025

(54) METHODS AND COMPOSITIONS FOR THE TREATMENT OF HPV-RELATED CANCER

(71) Applicant: Board of Regents, The University of Texas System, Austin, TX (US)

(72) Inventors: Ann Klopp, Houston, TX (US); Lauren Elizabeth Colbert, Houston, TX (US)

(73) Assignee: BOARD OF REGENTS, THE UNIVERSITY OF TEXAS SYSTEM, Austin, TX (US)

( * ) Notice: Subject to any disclaimer, the term of this patent is extended or adjusted under 35 U.S.C. 154(b) by 551 days.

(21) Appl. No.: 17/642,654

(22) PCT Filed: Sep. 11, 2020

(86) PCT No.: PCT/US2020/050285
§ 371 (c)(1),
(2) Date: Mar. 11, 2022

(87) PCT Pub. No.: WO2021/050800
PCT Pub. Date: Mar. 18, 2021

(65) Prior Publication Data
US 2022/0313748 A1 Oct. 6, 2022

Related U.S. Application Data

(60) Provisional application No. 62/899,496, filed on Sep. 12, 2019.

(51) Int. Cl.
| | |
|---|---|
| *A61K 35/741* | (2015.01) |
| *A61K 31/198* | (2006.01) |
| *A61K 31/407* | (2006.01) |
| *A61K 31/7036* | (2006.01) |
| *A61K 38/14* | (2006.01) |
| *A61N 5/10* | (2006.01) |
| *A61P 35/00* | (2006.01) |
| *C12Q 1/689* | (2018.01) |

(52) U.S. Cl.
CPC .......... *A61K 35/741* (2013.01); *A61K 31/198* (2013.01); *A61K 31/407* (2013.01); *A61K 31/7036* (2013.01); *A61K 38/14* (2013.01); *A61N 5/10* (2013.01); *A61P 35/00* (2018.01); *C12Q 1/689* (2013.01); *A61N 2005/1098* (2013.01)

(58) Field of Classification Search
CPC ... A61K 35/741; A61K 31/7036; A61P 35/00; C12Q 1/689
See application file for complete search history.

(56) References Cited

U.S. PATENT DOCUMENTS

| | | | |
|---|---|---|---|
| 2005/0221399 A1* | 10/2005 | Nakano | G01N 33/57411 435/7.23 |
| 2006/0093675 A1 | 5/2006 | Ebmeier et al. | |
| 2013/0316922 A1* | 11/2013 | Balashov | C12Q 1/689 435/6.12 |
| 2019/0078142 A1 | 3/2019 | Apte et al. | |

OTHER PUBLICATIONS

Champer et al. 2017 (The role of the vaginal microbiome in gynaecological cancer; 125(3): 309-315), (Year: 2017).*
Champer et al. 2017 (The role of the vaginal microbiome in gynaecological cancer; BJOG 125: 309-315). (Year: 2017).*
Macklaim et al. 2015 (Changes in vaginal microbiota following antimicrobial and probiotic therapy; Microbial Ecology in Health and Disease; 26: 27799) (Year: 2015).*
Yang et al. 2018 (Role of Lactobacillus in cervical cancer; Cancer Management and Research; 10: 1219-1229) (Year: 2018).*
Champer, M. et al., "The role of the vaginal microbiome in gynaecological cancer," *An International Journal of Obstetrics and Gynaecology*, 125 (2018): 309-315.
Colbert, L. E. et al., "Rectal Microbiome Diversity Predicts Disease Response at Completion of Radiation Therapy for Squamous Cell Carcinoma of the Cervix," *Oral Scientific Sessions*, 99 (2017): S51, abstract 108.
Fransen, F. et al., "BALB/c and C57BL/6 Mice Differ in Polyreactive IgA Abundance, which Impacts the Generation of Antigen-Specific IgA and Microbiota Diversity," *Immunity*, 43 (2015): 527-540.
Guerrero-Preston, R. et al., "High-resolution microbiome profiling uncovers *Fusobacterium nucleatum, Lactobacillus gasseri/johnsonii*, and *Lactobacillus vaginalis* associated to oral and oropharyngeal cancer in saliva from HPV positive and HPV negative patients treated with surgery and chemo-radiation," *Oncotarget*, 8 (2017): 110931-110948.
Gopalakrishnan, V. et al., "Gut microbiome modulates response to anti-PD-1 immunotherapy in melanoma patients," *Science*, 359 (2018): 97-103.
Iida, N. et al., "Commensal bacteria control cancer response to therapy by modulating the tumor microenvironment," *Science*, 342 (2013): 967-70.
Kostic, A. D. et al., "Fusobacterium nucleatum potentiates intestinal tumorigenesis and modulates the tumor-immune microenvironment," *Cell Host Microbe*, 14 (2013): 207-215.
Macklaim, J. M. et al., "Changes in vaginal microbiota following antimicrobial and probiotic therapy," *Microbial Ecology in Health & Disease*, 26 (2015): 1-8.
Matson, V. et al., "The commensal microbiome is associated with anti-PD-1 efficacy in metastatic melanoma patients," *Science*, 359 (2018): 104-108.
Mendes, M. C. S. et al., "Microbiota modification by probiotic supplementation reduces colitis associated colon cancer in mice," *World Journal of Gastroenterology*, 24 (2018): 1995-2008.

(Continued)

*Primary Examiner* — Mary Maille Lyons
(74) *Attorney, Agent, or Firm* — pH IP Law

(57) ABSTRACT

Provided herein are methods for identifying patient having treatment resistant cancers, such as HPV-related cancers. Therapeutic methods for treatment of cancers are also provided.

17 Claims, 11 Drawing Sheets

(56) References Cited

OTHER PUBLICATIONS

Mitra, A. et al., "The vaginal microbiota, human papillomavirus infection and cervical intraepithelial neoplasia: what do we know and where are we going next?," *Microbiome*, 4 (2018): 1-15.

Motevaseli E. et al., "The Effect of *Lactobacillus crispatus* and *Lactobacillus rhamnosus* Culture Supernatants on Expression of Autophagy Genes and HPV E6 and E7 Oncogenes in The HeLa Cell Line," *Cell J*, 17 (2016): 601-607.

Motevaseli, E. et al., "Normal and tumour cervical cells respond differently to vaginal lactobacilli, independent of pH and lactate," *Journal of Medical Microbiology*, 62 (2013): 1065-1072.

PCT International Preliminary Report on Patentability issued in International Patent Application No. PCT/US2020/050285, mailed Mar. 24, 2022.

PCT International Search Report and Written Opinion issued in International Patent Application No. PCT/US2020/050285, mailed Dec. 15, 2020.

Rescigno, M., "A 'fit' microbiota to potentiate cancer immunotherapy," Genome Medicine, 7 (2015): 131, 2 pages.

Routy, B. et al., "Gut microbiome influences efficacy of PD-1-based immunotherapy against epithelial tumors," *Science*, 359 (2018): 91-97.

Sonnenberg, G.F. et al., "Innate lymphoid cell interactions with microbiota: implications for intestinal health and disease," *Immunity*, 37 (2012): 601-610.

Viaud, S. et al., "The intestinal microbiota modulates the anticancer immune effects of cyclophosphamide," *Science*, 342 (2013): 971-976.

\* cited by examiner

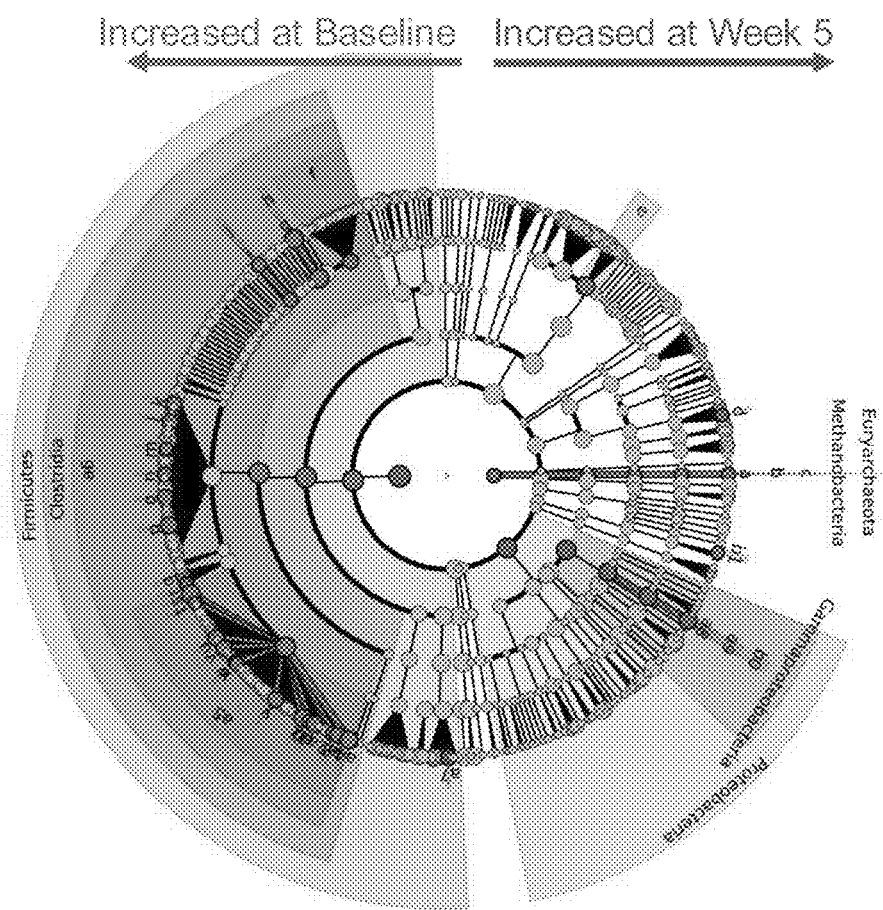
FIG. 1C - continued

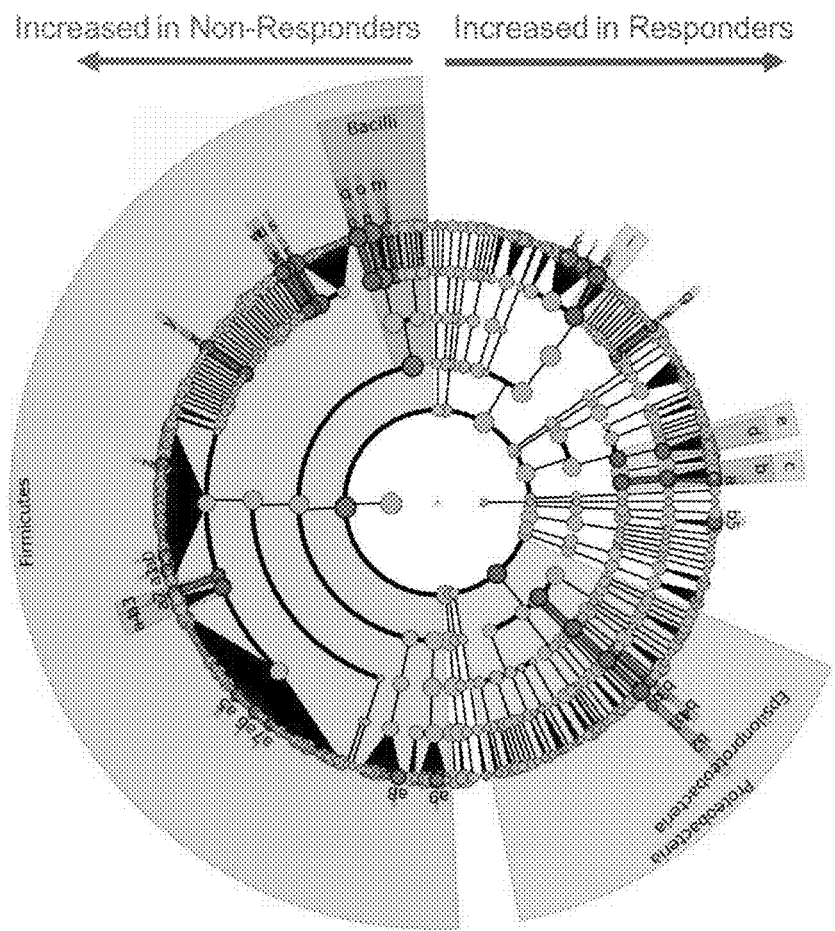
FIG. 1E-continued

METHODS AND COMPOSITIONS FOR THE TREATMENT OF HPV-RELATED CANCER

REFERENCE TO RELATED APPLICATIONS

The present application is a national phase application under 35 U.S.C. § 371 of International Application No. PCT/US2020/050285, filed Sep. 11, 2020, which claims the benefit of U.S. Provisional Patent Application Ser. No. 62/899,496, filed Sep. 12, 2019, the entire contents of each of which are incorporated herein by reference.

BACKGROUND

1. Field

The present invention relates generally to the field of pharmacology and medicine. More particularly, it concerns compositions and methods for treatment of cancer.

2. Description of Related Art

The gut and tumor microbiome have been shown to play a key role in generating a systemic immune response during cancer therapy. In patients receiving immune checkpoint inhibitors for melanoma, lung and kidney cancers, the presence of a diverse microbiome is strongly associated with response to treatment and generation of effective CD8 T cell response (1-3). In murine models of lymphoma, colorectal cancer and melanoma, ablation of the intestinal microbiome suppresses anti-tumor immunity following treatment with immunotherapy, oxaliplatin and cyclophosphamide chemotherapy (4-8). These effects have been attributed to direct and indirect interaction of the microbiota with the rich immunologic environment of the intestine; however, the impact of the microbiome on response to radiation therapy for cervical cancer and other cancers has not been well studied.

Cervical cancer remains the most common malignancy in women worldwide, with an annual incidence of more than 500,000 cases and an annual death rate of more than 250,000 women per year (9). Locally advanced cervical cancers are treated with chemoradiation over a 7-week course of treatment consisting of daily external beam radiation therapy followed by brachytherapy. The rate of response during chemoradiation is variable; some cervical cancers regress completely by mid therapy, while others persist through completion of treatment. Rapid response is associated with increased likelihood of cure (10). Thus, there is an unmet need to better understand the factors associated with tumor regression in response to radiation therapy.

SUMMARY

In a first embodiment, the present disclosure provides methods of treating a subject having an HPV-related cancer comprising identifying a subject having the presence of *Lactobacillus inners* and treating the subject with an effective amount of an antibiotic and/or a probiotic to reduce the level of *Lactobacillus inners* in the subject. In some aspects, the subject is human. In specific aspects, the subject is female.

In some aspects, the presence of *Lactobacillus inners* is detected in fecal sample, blood sample, skin swab, cervical swab or mucosa sample from the subject. In particular aspects, the presence of *Lactobacillus inners* is detected in a cervical mucosa sample. In certain aspects, the method further comprises obtaining a sample from the subject. In specific aspects, the sample is a cervical mucosa sample. In some aspects, the amount *Lactobacillus inners* is quantified. For example, the presence of *Lactobacillus inners* is detected by sequencing, nucleic acid hybridization, PCR or an immunoassay. In some aspects, the presence of *Lactobacillus inners* is detected by sequencing or PCR of 16S rRNA.

In certain aspects, the subject has an ovarian cancer or cervical cancer the subject has a squamous carcinoma or an adenocarcinoma. In some aspects, the cancer expresses an HPV polypeptide.

In some aspects, the subject is treated with a probiotic is administered to the subject. In particular aspects, the probiotic is free of *Lactobacillus inners*. In certain aspects, the probiotic is free of *Lactobacillus* species. In some aspects, the probiotic comprises *Prevotella, Bacteroides* and/or *Porphyromonas* species. In specific aspects, the probiotic comprises a mixture of bacteria. In particular aspects, the probiotic comprises a mixture of bacteria having a reduced amount of *Lactobacillus* species relative to an average sample from a human. In some aspects, probiotic is a bacteria monoculture. In certain aspects, the probiotic is applied to the site where the presence of *Lactobacillus inners* was detected. In specific aspects, probiotic is applied to the cervix. In other aspects, probiotic is administered orally.

In some aspects, the subject is treated with an antibiotic. In certain aspects, the antibiotic is administered systemically. In some aspects, the antibiotic is administered orally or intravenously. In particular aspects, the antibiotic is administered to the site where the presence of *Lactobacillus inners* was detected. In some aspects, the antibiotic comprises a mixture of antibiotics.

In additional aspects, the method further comprises determining if the *Lactobacillus inners* are antibiotic resistant. In some aspects, the antibiotic is an antibiotic or antibiotic cocktail that the *Lactobacillus inners* are not resistant to. In certain aspects, the subject is treated with a probiotic and an antibiotic. In some aspects, the bacteria in the probiotic is resistant to the administered antibiotic.

In further aspects, the method further comprises collecting a sample from the subject after administering the probiotic or antibiotic and testing the sample for *Lactobacillus inners*.

In additional aspects, the method further comprises administering at least first anticancer therapy to the subject. In some aspects, the anticancer therapy comprises radiation therapy. In certain aspects, the anticancer therapy comprises chemotherapy. In particular aspects, the anticancer therapy comprises chemotherapy and radiation therapy. In certain aspects, the method further comprises administering an antibiotic and/or probiotic to the subject after the anticancer therapy.

Further embodiments provide kits comprising a reagent specific for detecting *Lactobacillus inners*; and a probiotic and/or antibiotic composition. In some aspects, the reagent specific for detecting *Lactobacillus inners* comprises PCR reagents. In certain aspects, the reagent specific for detecting *Lactobacillus inners* comprises antibodies.

As used herein the specification, "a" or "an" may mean one or more. As used herein in the claim(s), when used in conjunction with the word "comprising," the words "a" or "an" may mean one or more than one.

The use of the term "or" in the claims is used to mean "and/or" unless explicitly indicated to refer to alternatives only or the alternatives are mutually exclusive, although the disclosure supports a definition that refers to only alternatives and "and/or." As used herein "another" may mean at least a second or more.

The term "about" refers to the stated value plus or minus 5%.

As used herein, "essentially free," in terms of a specified component, is used herein to mean that none of the specified component has been purposefully formulated into a composition and/or is present only as a contaminant or in trace amounts. The total amount of the specified component resulting from any unintended contamination of a composition is therefore well below 0.05%, preferably below 0.01%. Most preferred is a composition in which no amount of the specified component can be detected with standard analytical methods.

As used herein, a composition that is "substantially free" of a specified substance or material contains ≤30%, ≤20%, ≤15%, more preferably ≤10%, even more preferably ≤5%, or most preferably ≤1% of the substance or material.

Other objects, features and advantages of the present invention will become apparent from the following detailed description. It should be understood, however, that the detailed description and the specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

DESCRIPTION OF ILLUSTRATIVE EMBODIMENTS

Figure 1A:
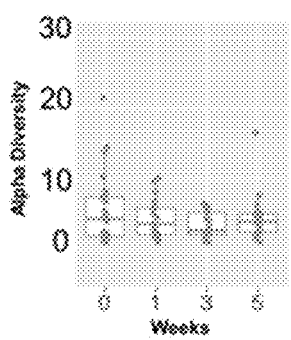
FIGS. 1A-1F: Cervical microbiome composition predicts treatment response to Chemoradiation. Alpha Diversity (ISD) of cervical microbiome during the 5-week course of chemoradiation treatment (FIG. 1A). The relative abundances of taxa present at the genus level are shown for all cervical microbiota samples (FIG. 1B). LEfSe analysis and resulting cladogram demonstrating change in cervical microbiome composition from baseline to the $5^{th}$ week of chemoradiation (FIG. 1C). Alpha diversity (ISD) of cervical microbiome samples over time for patients with an exceptional, standard or poor response to chemoradiation (FIG. 1D). LEfSe analysis and resulting cladogram showing organisms enriched and depleted in exceptional and standard responders as compared to patients with a poor response to chemoradiation (FIG. 1E). Kaplan Meier curve for Recurrence-free survival (RFS) for all patients, demonstrating high lactobacillus:porphyromonas ratio (LPR) associated with decreased RFS (12.3 months vs NR; log-rank p=0.002 (FIG. 1F).

To investigate the hypothesis that the local and intestinal and/or cervical microbiome may support the development of anti-tumor immunity during chemoradiation treatment, the present studies comprises a prospective serial analysis of the cervical and rectal microbiome and clonal T cell amplification during radiation treatment.

Composition of the microbiome has been shown to impact generation of a tumor-specific immune response following chemotherapy and immune checkpoint blockade. It was hypothesized that the local and intestinal microbiota may also impact immune activation and radiation response. The microbiota and T-cell repertoire of 60 cervical cancer patients was prospectively assessed throughout CRT. Predominance of *Lactobacillus inners* species in the cervix was associated with failure to expand clonal T-cells and decreased relapse-free survival. Patients with a robust response to CRT developed clonal expansion of T-cells, suggesting that highly radiation responsive cervical cancers generate an antigen specific immune response. Presence of vaginal *Lactobacillus* were associated with decreased presence of activated CD8+ T-cell infiltration and decreased radiation response in an orthotopic model of HPV cancer, suggesting that microbial diversity is required for generation of effective antitumor immunity in radiation responsive HPV cancers.

II. Methods of Use

Certain embodiments of the present disclosure concern methods for the use of antibiotics or probiotics for treating cancer, such as HPV-related cancer, particularly cervical cancer.

"Treating" or treatment of a disease or condition refers to executing a protocol, which may include administering one or more drugs to a patient, in an effort to alleviate signs or symptoms of the disease. Desirable effects of treatment include decreasing the rate of disease progression, ameliorating or palliating the disease state, and remission or improved prognosis. Alleviation can occur prior to signs or symptoms of the disease or condition appearing, as well as after their appearance. Thus, "treating" or "treatment" may include "preventing" or "prevention" of disease or undesirable condition. In addition, "treating" or "treatment" does not require complete alleviation of signs or symptoms, does not require a cure, and specifically includes protocols that have only a marginal effect on the patient.

As used herein, the term "patient" or "subject" refers to a living mammalian organism, such as a human, monkey, cow, sheep, goat, dog, cat, mouse, rat, guinea pig, or transgenic species thereof. In certain embodiments, the patient or subject is a primate. Non-limiting examples of human patients are adults, juveniles, infants and fetuses.

The term "effective," as that term is used in the specification and/or claims, means adequate to accomplish a desired, expected, or intended result. "Effective amount," "therapeutically effective amount" or "pharmaceutically effective amount" when used in the context of treating a patient or subject with a compound means that amount of the compound which, when administered to a subject or patient for treating or preventing a disease, is an amount sufficient to affect such treatment or prevention of the disease.

A. Pharmaceutical Formulations and Routes of Administration

Where clinical applications are contemplated, it will be necessary to prepare pharmaceutical compositions in a form appropriate for the intended application. In some embodiments, such formulation with the compounds of the present disclosure is contemplated. Generally, this will entail preparing compositions that are essentially free of pyrogens, as well as other impurities that could be harmful to humans or animals.

One will generally desire to employ appropriate salts and buffers to render delivery vectors stable and allow for uptake by target cells. Buffers also will be employed when recombinant cells are introduced into a patient. Aqueous compositions of the present disclosure comprise an effective amount of the vector to cells, dissolved or dispersed in a pharmaceutically acceptable carrier or aqueous medium. Such compositions also are referred to as inocula. The phrase "pharmaceutically or pharmacologically acceptable" refers to molecular entities and compositions that do not produce adverse, allergic, or other untoward reactions when administered to an animal or a human. As used herein, "pharmaceutically acceptable carrier" includes any and all solvents, dispersion media, coatings, antibacterial and antifungal agents, isotonic and absorption delaying agents and the like. The use of such media and agents for pharmaceutically active substances is well known in the art. Except insofar as any conventional media or agent is incompatible with the vectors or cells of the present disclosure, its use in therapeutic compositions is contemplated. Supplementary active ingredients also can be incorporated into the compositions.

The active compositions of the present disclosure may include classic pharmaceutical preparations. Administration of these compositions according to the present disclosure will be via any common route so long as the target tissue is available via that route. Such routes include oral, nasal, buccal, rectal, vaginal or topical route. Alternatively, administration may be by orthotopic, intradermal, subcutaneous, intramuscular, intratumoral, intraperitoneal, or intravenous injection. Such compositions would normally be administered as pharmaceutically acceptable compositions, described supra.

The active compounds may also be administered parenterally or intraperitoneally. Solutions of the active compounds as free base or pharmacologically acceptable salts can be prepared in water suitably mixed with a surfactant, such as hydroxypropylcellulose. Dispersions can also be prepared in glycerol, liquid polyethylene glycols, and mixtures thereof and in oils. Under ordinary conditions of storage and use, these preparations contain a preservative to prevent the growth of microorganisms.

The pharmaceutical forms suitable for injectable use include sterile aqueous solutions or dispersions and sterile powders for the extemporaneous preparation of sterile injectable solutions or dispersions. In all cases the form must be sterile and must be fluid to the extent that easy syringability exists. It must be stable under the conditions of manufacture and storage and must be preserved against the contaminating action of microorganisms, such as bacteria and fungi. The carrier can be a solvent or dispersion medium containing, for example, water, ethanol, polyol (for example, glycerol, propylene glycol, and liquid polyethylene glycol, and the like), suitable mixtures thereof, and vegetable oils. The proper fluidity can be maintained, for example, by the use of a coating, such as lecithin, by the maintenance of the required particle size in the case of dispersion and by the use of surfactants. The prevention of the action of microorganisms can be brought about by various antibacterial and antifungal agents, for example, parabens, chlorobutanol, phenol, sorbic acid, thimerosal, and the like. In many cases, it will be preferable to include isotonic agents, for example, sugars or sodium chloride. Prolonged absorption of the injectable compositions can be brought about by the use in the compositions of agents delaying absorption, for example, aluminum monostearate and gelatin.

Sterile injectable solutions are prepared by incorporating the active compounds in the required amount in the appropriate solvent with several of the other ingredients enumerated above, as required, followed by filtered sterilization. Generally, dispersions are prepared by incorporating the various sterilized active ingredients into a sterile vehicle which contains the basic dispersion medium and the required other ingredients from those enumerated above. In the case of sterile powders for the preparation of sterile injectable solutions, the preferred methods of preparation are vacuum-drying and freeze-drying techniques which yield a powder of the active ingredient plus any additional desired ingredient from a previously sterile-filtered solution thereof.

As used herein, "pharmaceutically acceptable carrier" includes any and all solvents, dispersion media, coatings, antibacterial and antifungal agents, isotonic and absorption delaying agents and the like. The use of such media and agents for pharmaceutical active substances is well known in the art. Except insofar as any conventional media or agent is incompatible with the active ingredient, its use in the therapeutic compositions is contemplated. Supplementary active ingredients can also be incorporated into the compositions.

For oral administration the compounds described herein may be incorporated with excipients and used in the form of non-ingestible mouthwashes and dentifrices. A mouthwash may be prepared incorporating the active ingredient in the required amount in an appropriate solvent, such as a sodium borate solution (Dobell's Solution). Alternatively, the active ingredient may be incorporated into an antiseptic wash containing sodium borate, glycerin and potassium bicarbonate. The active ingredient may also be dispersed in dentifrices, including: gels, pastes, powders and slurries. The active ingredient may be added in a therapeutically effective amount to a paste dentifrice that may include water, binders, abrasives, flavoring agents, foaming agents, and humectants.

The compositions of the present disclosure may be formulated in a neutral or salt form. Pharmaceutically-acceptable salts include the acid addition salts (formed with the free amino groups of the protein) and which are formed with inorganic acids such as, for example, hydrochloric or phosphoric acids, or such organic acids as acetic, oxalic, tartaric, mandelic, and the like. Salts formed with the free carboxyl groups can also be derived from inorganic bases such as, for example, sodium, potassium, ammonium, calcium, or ferric hydroxides, and such organic bases as isopropylamine, trimethylamine, histidine, procaine and the like.

Upon formulation, solutions will be administered in a manner compatible with the dosage formulation and in such amount as is therapeutically effective. The formulations are easily administered in a variety of dosage forms such as injectable solutions, drug release capsules and the like. For parenteral administration in an aqueous solution, for example, the solution should be suitably buffered if necessary and the liquid diluent first rendered isotonic with sufficient saline or glucose. These particular aqueous solutions are especially suitable for intravenous, intramuscular, subcutaneous and intraperitoneal administration. In this connection, sterile aqueous media which can be employed will be known to those of skill in the art in light of the present disclosure. For example, one dosage could be dissolved in 1 ml of isotonic NaCl solution and either added to 1000 mL of hypodermoclysis fluid or injected at the proposed site of infusion, (see for example, "Remington's Pharmaceutical Sciences," 15th Edition, pages 1035-1038 and 1570-1580). Some variation in dosage will necessarily occur depending on the condition of the subject being treated. The person responsible for administration will, in any event, determine the appropriate dose for the individual subject. Moreover, for human administration, preparations should meet sterility, pyrogenicity, and general safety and purity standards as required by the appropriate regulatory agencies for the safety of pharmaceutical agents.

In particular, the compositions that may be used in treating cancer in a subject (e.g., a human subject) are disclosed herein. The compositions described above are preferably administered to a mammal (e.g., rodent, human, non-human primates, canine, bovine, ovine, equine, feline, etc.) in an effective amount, that is, an amount capable of producing a desirable result in a treated subject (e.g., causing apoptosis of cancerous cells). Toxicity and therapeutic efficacy of the compositions utilized in methods of the disclosure can be determined by standard pharmaceutical procedures. As is well known in the medical and veterinary arts, dosage for any one animal depends on many factors, including the subject's size, body surface area, body weight, age, the particular composition to be administered, time and route of administration, general health, the clinical symptoms of the infection or cancer and other drugs being administered concurrently. A composition as described herein is typically administered at a dosage that induces death of cancerous cells (e.g., induces apoptosis of a cancer cell), as assayed by identifying a reduction in hematological parameters (complete blood count—CBC), or cancer cell growth or proliferation. In some embodiments, amounts of the compounds used to induce apoptosis of the cancer cells is calculated to be from about 0.01 mg to about 10,000 mg/day. In some embodiments, the amount is from about 1 mg to about 1,000 mg/day. In some embodiments, these dosings may be reduced or increased based upon the biological factors of a particular patient such as increased or decreased metabolic breakdown of the drug or decreased uptake by the digestive tract if administered orally. Additionally, the compounds may be more efficacious and thus a smaller dose is required to achieve a similar effect. Such a dose is typically administered once a day for a few weeks or until sufficient reducing in cancer cells has been achieved.

The therapeutic methods of the disclosure (which include prophylactic treatment) in general include administration of a therapeutically effective amount of the compositions described herein to a subject in need thereof, including a mammal, particularly a human. Such treatment will be suitably administered to subjects, particularly humans, suffering from, having, susceptible to, or at risk for a disease, disorder, or symptom thereof. Determination of those subjects "at risk" can be made by any objective or subjective determination by a diagnostic test or opinion of a subject or health care provider (e.g., genetic test, enzyme or protein marker, marker (as defined herein), family history, and the like).

B. Combination Therapies

Certain embodiments of the present disclosure provide for the administration or application of one or more secondary forms of therapies for the treatment or prevention of a disease. For example, the disease may be a hyperproliferative disease, such as cancer.

The secondary form of therapy may be administration of one or more secondary pharmacological agents that can be applied in the treatment or prevention of cancer. If the secondary therapy is a pharmacological agent, it may be administered prior to, concurrently, or following administration of the present compounds.

The interval between the administration of the present compounds and the secondary therapy may be any interval as determined by those of ordinary skill in the art. For example, the interval may be minutes to weeks. In embodiments where the agents are separately administered, one would generally ensure that a long period of time did not expire between the time of each delivery, such that each therapeutic agent would still be able to exert an advantageously combined effect on the subject. For example, the interval between therapeutic agents may be about 12 h to about 24 h of each other and, more preferably, within about 6 hours to about 12 h of each other. In some situations the time period for treatment may be extended, however, where several days (2, 3, 4, 5, 6 or 7) to several weeks (1, 2, 3, 4, 5, 6, 7 or 8) lapse between the respective administrations. In some embodiments, the timing of administration of a secondary therapeutic agent is determined based on the response of the subject to the nanoparticles.

Various combinations may be employed. For the example below a probiotic or antibiotic is "A" and an anti-cancer therapy is "B":

| A/B/A | B/A/B | B/B/A | A/A/B | A/B/B | B/A/A | A/B/B/B | B/A/B/B |
|-------|-------|-------|-------|-------|-------|---------|---------|
| B/B/B/A | | B/B/A/B | A/A/B/B | | A/B/A/B | A/B/B/A | B/B/A/A |
| B/A/B/A | | B/A/A/B | A/A/A/B | | B/A/A/A | A/B/A/A | A/A/B/A |

Administration of any compound or therapy of the present disclosure to a patient will follow general protocols for the administration of such compounds, taking into account the toxicity, if any, of the agents. Therefore, in some embodiments there is a step of monitoring toxicity that is attributable to combination therapy. It is expected that the treatment cycles may be repeated. It also is contemplated that various standard therapies, as well as surgical intervention, may be applied in combination with the described therapy.

In specific aspects, it is contemplated that a standard therapy will include chemotherapy, radiotherapy, immunotherapy, surgical therapy or gene therapy and may be employed in combination with the inhibitor of gene expression therapy, anticancer therapy, or both the inhibitor of gene expression therapy and the anti-cancer therapy, as described herein.

1. Chemotherapy

A wide variety of chemotherapeutic agents may be used in accordance with the present embodiments. Examples of chemotherapeutic agents include alkylating agents, such as thiotepa and cyclosphosphamide; alkyl sulfonates, such as busulfan, improsulfan, and piposulfan; aziridines, such as benzodopa, carboquone, meturedopa, and uredopa; ethylenimines and methylamelamines, including altretamine, triethylenemelamine, trietylenephosphoramide, triethiylenethiophosphoramide, and trimethylolomelamine; acetogenins (especially bullatacin and bullatacinone); a camptothecin (including the synthetic analogue topotecan); bryostatin; callystatin; CC-1065 (including its adozelesin, carzelesin and bizelesin synthetic analogues); cryptophycins (particularly cryptophycin 1 and cryptophycin 8); dolastatin; duocarmycin (including the synthetic analogues, KW-2189 and CBI-TM1); eleutherobin; pancratistatin; a sarcodictyin; spongistatin; nitrogen mustards, such as chlorambucil, chlornaphazine, cholophosphamide, estramustine, ifosfamide, mechlorethamine, mechlorethamine oxide hydrochloride, melphalan, novembichin, phenesterine, prednimustine, trofosfamide, and uracil mustard; nitrosureas, such as carmustine, chlorozotocin, fotemustine, lomustine, nimustine, and ranimnustine; antibiotics, such as the enediyne antibiotics (e.g., calicheamicin, especially calicheamicin gammalI and calicheamicin omegal1); dynemicin, including dynemicin A; bisphosphonates, such as clodronate; an esperamicin; as well as neocarzinostatin chromophore and related chromoprotein enediyne antiobiotic chromophores, aclacinomysins, actinomycin, authrarnycin, azaserine, bleomycins, cactinomycin, carabicin, carminomycin, carzinophilin, chromomycinis, dactinomycin, daunorubicin, detorubicin, 6-diazo-5-oxo-L-norleucine, doxorubicin (including morpholino-doxorubicin, cyanomorpholino-doxorubicin, 2-pyrrolino-doxorubicin and deoxydoxorubicin), epirubicin, esorubicin, idarubicin, marcellomycin, mitomycins, such as mitomycin C, mycophenolic acid, nogalarnycin, olivomycins, peplomycin, potfiromycin, puromycin, quelamycin, rodorubicin, streptonigrin, streptozocin, tubercidin, ubenimex, zinostatin, and zorubicin; anti-metabolites, such as methotrexate and 5-fluorouracil (5-FU); folic acid analogues, such as denopterin, pteropterin, and trimetrexate; purine analogs, such as fludarabine, 6-mercaptopurine, thiamiprine, and thioguanine; pyrimidine analogs, such as ancitabine, azacitidine, 6-azauridine, carmofur, cytarabine, dideoxyuridine, doxifluridine, enocitabine, and floxuridine; androgens, such as calusterone, dronanolone propionate, epitiostanol, mepitiostane, and testolactone; anti-adrenals, such as mitotane and trilostane; folic acid replenisher, such as frolinic acid; aceglatone; aldophosphamide glycoside; aminolevulinic acid; eniluracil; amsacrine; bestrabucil; bisantrene; edatraxate; defofamine; demecolcine; diaziquone; elformithine; elliptinium acetate; an epothilone; etoglucid; gallium nitrate; hydroxyurea; lentinan; lonidainine; maytansinoids, such as maytansine and ansamitocins; mitoguazone; mitoxantrone; mopidanmol; nitraerine; pentostatin; phenamet; pirarubicin; losoxantrone; podophyllinic acid; 2-ethylhydrazide; procarbazine; PSKpolysaccharide complex; razoxane; rhizoxin; sizofiran; spirogermanium; tenuazonic acid; triaziquone; 2,2',2"-trichlorotriethylamine; trichothecenes (especially T-2 toxin, verracurin A, roridin A and anguidine); urethan; vindesine; dacarbazine; mannomustine; mitobronitol; mitolactol; pipobroman; gacytosine; arabinoside ("Ara-C"); cyclophosphamide; taxoids, e.g., paclitaxel and docetaxel gemcitabine; 6-thioguanine; mercaptopurine; platinum coordination complexes, such as cisplatin, oxaliplatin, and carboplatin; vinblastine; platinum; etoposide (VP-16); ifosfamide; mitoxantrone; vincristine; vinorelbine; novantrone; teniposide; edatrexate; daunomycin; aminopterin; xeloda; ibandronate; irinotecan (e.g., CPT-11); topoisomerase inhibitor RFS 2000; difluorometlhylornithine (DMFO); retinoids, such as retinoic acid; capecitabine; carboplatin, procarbazine, plicomycin, gemcitabien, navelbine, farnesyl-protein transferase inhibitors, transplatinum, and pharmaceutically acceptable salts, acids, or derivatives of any of the above.

2. Radiotherapy

Other factors that cause DNA damage and have been used extensively include what are known as γ-rays, X-rays, and/or the directed delivery of radioisotopes to tumor cells. Other forms of DNA damaging factors are also contemplated, such as microwaves, proton beam irradiation, and UV-irradiation. It is likely that all of these factors affect a broad range of damage on DNA, on the precursors of DNA, on the replication and repair of DNA, and on the assembly and maintenance of chromosomes. Dosage ranges for X-rays range from daily doses of 50 to 200 roentgens for prolonged periods of time (3 to 4 wk), to single doses of 2000 to 6000 roentgens. Dosage ranges for radioisotopes vary widely, and depend on the half-life of the isotope, the strength and type of radiation emitted, and the uptake by the neoplastic cells.

3. Immunotherapy

The skilled artisan will understand that additional immunotherapies may be used in combination or in conjunction with methods of the embodiments. In the context of cancer treatment, immunotherapeutics, may rely on the use of immune effector cells and molecules to target and destroy cancer cells. Rituximab (RITUXAN®) is such an example. The immune effector may be, for example, an antibody specific for some marker on the surface of a tumor cell. The antibody alone may serve as an effector of therapy or it may recruit other cells to actually affect cell killing. The antibody also may be conjugated to a drug or toxin (chemotherapeutic, radionuclide, ricin A chain, cholera toxin, pertussis toxin, etc.) and serve as a targeting agent. Alternatively, the effector may be a lymphocyte carrying a surface molecule that interacts, either directly or indirectly, with a tumor cell target. Various effector cells include cytotoxic T cells and NK cells In one aspect of immunotherapy, the tumor cell may bear some marker that is amenable to targeting, i.e., is not present on the majority of other cells. Many tumor markers exist and any of these may be suitable for targeting in the context of the present embodiments. Common tumor markers include CD20, carcinoembryonic antigen, tyrosinase (p97), gp68, TAG-72, HMFG, Sialyl Lewis Antigen, MucA, MucB, PLAP, laminin receptor, erb B, and p155. An alternative aspect of immunotherapy is to combine anticancer effects with immune stimulatory effects. Immune stimulating molecules also exist including: cytokines, such as IL-2, IL-4, IL-12, GM-CSF, gamma-IFN, chemokines, such as MIP-1, MCP-1, IL-8, and growth factors, such as FLT3 ligand.

Examples of immunotherapies that may be used are immune adjuvants, e.g., *Mycobacterium bovis, Plasmodium falciparum*, dinitrochlorobenzene, and aromatic compounds; cytokine therapy, e.g., interferons α, β, and γ, IL-1, GM-CSF, and TNF; gene therapy, e.g., TNF, IL-1, IL-2, and p53; and monoclonal antibodies, e.g., anti-CD20, anti-ganglioside GM2, and anti-p185. It is contemplated that one or more anti-cancer therapies may be employed with the antibody therapies described herein.

In some embodiments, the immunotherapy may be an immune checkpoint inhibitor. Immune checkpoints are molecules in the immune system that either turn up a signal (e.g., co-stimulatory molecules) or turn down a signal. Inhibitory checkpoint molecules that may be targeted by immune checkpoint blockade include adenosine A2A receptor (A2AR), B7-H3 (also known as CD276), B and T lymphocyte attenuator (BTLA), cytotoxic T-lymphocyte-associated protein 4 (CTLA-4, also known as CD152), indoleamine 2,3-dioxygenase (IDO), killer-cell immunoglobulin (KIR), lymphocyte activation gene-3 (LAG3), programmed death 1 (PD-1), T-cell immunoglobulin domain and mucin domain 3 (TIM-3) and V-domain Ig suppressor of T cell activation (VISTA). In particular, the immune checkpoint inhibitors target the PD-1 axis and/or CTLA-4.

The immune checkpoint inhibitors may be drugs such as small molecules, recombinant forms of ligand or receptors, or, in particular, are antibodies, such as human antibodies. Known inhibitors of the immune checkpoint proteins or analogs thereof may be used, in particular chimerized, humanized or human forms of antibodies may be used. As the skilled person will know, alternative and/or equivalent names may be in use for certain antibodies mentioned in the present disclosure. Such alternative and/or equivalent names are interchangeable in the context of the present disclosure. For example it is known that lambrolizumab is also known under the alternative and equivalent names MK-3475 and pembrolizumab.

In some embodiments, the PD-1 binding antagonist is a molecule that inhibits the binding of PD-1 to its ligand binding partners. In a specific aspect, the PD-1 ligand binding partners are PDL1 and/or PDL2. In another embodiment, a PDL1 binding antagonist is a molecule that inhibits the binding of PDL1 to its binding partners. In a specific aspect, PDL1 binding partners are PD-1 and/or B7-1. In another embodiment, the PDL2 binding antagonist is a molecule that inhibits the binding of PDL2 to its binding partners. In a specific aspect, a PDL2 binding partner is PD-1. The antagonist may be an antibody, an antigen binding fragment thereof, an immunoadhesin, a fusion protein, or oligopeptide.

In some embodiments, the PD-1 binding antagonist is an anti-PD-1 antibody (e.g., a human antibody, a humanized antibody, or a chimeric antibody). In some embodiments, the anti-PD-1 antibody is selected from the group consisting of nivolumab, pembrolizumab, and CT-011. In some embodiments, the PD-1 binding antagonist is an immunoadhesin (e.g., an immunoadhesin comprising an extracellular or PD-1 binding portion of PDL1 or PDL2 fused to a constant region (e.g., an Fc region of an immunoglobulin sequence). In some embodiments, the PD-1 binding antagonist is AMP-224. Nivolumab, also known as MDX-1106-04, MDX-1106, ONO-4538, BMS-936558, and OPDIVO is an anti-PD-1 antibody described in WO2006/121168. Pembrolizumab, also known as MK-3475, Merck 3475, lambrolizumab, KEYTRUDA®, and SCH-900475, is an anti-PD-1 antibody described in WO2009/114335. CT-011, also known as hBAT or hBAT-1, is an anti-PD-1 antibody described in WO2009/101611. AMP-224, also known as B7-DCIg, is a PDL2-Fc fusion soluble receptor described in WO2010/027827 and WO2011/066342.

Another immune checkpoint that can be targeted in the methods provided herein is the cytotoxic T-lymphocyte-associated protein 4 (CTLA-4), also known as CD152. The complete cDNA sequence of human CTLA-4 has the Genbank accession number L15006. CTLA-4 is found on the surface of T cells and acts as an "off" switch when bound to CD80 or CD86 on the surface of antigen-presenting cells. CTLA4 is a member of the immunoglobulin superfamily that is expressed on the surface of Helper T cells and transmits an inhibitory signal to T cells. CTLA4 is similar to the T-cell co-stimulatory protein, CD28, and both molecules bind to CD80 and CD86, also called B7-1 and B7-2 respectively, on antigen-presenting cells. CTLA4 transmits an inhibitory signal to T cells, whereas CD28 transmits a stimulatory signal. Intracellular CTLA4 is also found in regulatory T cells and may be important to their function. T cell activation through the T cell receptor and CD28 leads to increased expression of CTLA-4, an inhibitory receptor for B7 molecules.

In some embodiments, the immune checkpoint inhibitor is an anti-CTLA-4 antibody (e.g., a human antibody, a humanized antibody, or a chimeric antibody), an antigen binding fragment thereof, an immunoadhesin, a fusion protein, or oligopeptide.

Anti-human-CTLA-4 antibodies (or VH and/or VL domains derived therefrom) suitable for use in the present methods can be generated using methods well known in the art. Alternatively, art recognized anti-CTLA-4 antibodies can be used. For example, the anti-CTLA-4 antibodies disclosed in: U.S. Pat. No. 8,119,129, WO 01/14424, WO 98/42752; WO 00/37504 (CP675,206, also known as tremelimumab; formerly ticilimumab), U.S. Pat. No. 6,207,156, can be used in the methods disclosed herein. The teachings of each of the aforementioned publications are hereby incorporated by reference. Antibodies that compete with any of these art-recognized antibodies for binding to CTLA-4 also can be used. For example, a humanized CTLA-4 antibody is described in U.S. Pat. No. 8,017,114; all incorporated herein by reference.

An exemplary anti-CTLA-4 antibody is ipilimumab (also known as 10D1, MDX-010, MDX-101, and Yervoy®) or antigen binding fragments and variants thereof. In other embodiments, the antibody comprises the heavy and light chain CDRs or VRs of ipilimumab. Accordingly, in one embodiment, the antibody comprises the CDR1, CDR2, and CDR3 domains of the VH region of ipilimumab, and the CDR1, CDR2 and CDR3 domains of the VL region of ipilimumab. In another embodiment, the antibody competes for binding with and/or binds to the same epitope on CTLA-4 as the above-mentioned antibodies. In another embodiment, the antibody has at least about 90% variable region amino acid sequence identity with the above-mentioned antibodies (e.g., at least about 90%, 95%, or 99% variable region identity with ipilimumab).

Other molecules for modulating CTLA-4 include CTLA-4 ligands and receptors such as described in U.S. Pat. Nos. U.S. Pat. Nos. 5,844,905, 5,885,796 and International Patent Application Nos. WO1995001994 and WO1998042752; all incorporated herein by reference, and immunoadhesions such as described in U.S. Pat. No. 8,329,867, incorporated herein by reference.

4. Surgery

Approximately 60% of persons with cancer will undergo surgery of some type, which includes preventative, diagnostic or staging, curative, and palliative surgery. Curative surgery includes resection in which all or part of cancerous tissue is physically removed, excised, and/or destroyed and may be used in conjunction with other therapies, such as the treatment of the present embodiments, chemotherapy, radiotherapy, hormonal therapy, gene therapy, immunotherapy, and/or alternative therapies. Tumor resection refers to physical removal of at least part of a tumor. In addition to tumor resection, treatment by surgery includes laser surgery, cryosurgery, electrosurgery, and microscopically-controlled surgery (Mohs' surgery).

Upon excision of part or all of cancerous cells, tissue, or tumor, a cavity may be formed in the body. Treatment may be accomplished by perfusion, direct injection, or local application of the area with an additional anti-cancer therapy. Such treatment may be repeated, for example, every 1, 2, 3, 4, 5, 6, or 7 days, or every 1, 2, 3, 4, and 5 weeks or every 1, 2, 3, 4, 5, 6, 7, 8, 9, 10, 11, or 12 months. These treatments may be of varying dosages as well.

5. Other Agents

It is contemplated that other agents may be used in combination with certain aspects of the present embodiments to improve the therapeutic efficacy of treatment. Further examples can therefore be contemplated. These additional agents include agents that affect the upregulation of cell surface receptors and GAP junctions, cytostatic and differentiation agents, inhibitors of cell adhesion, agents that increase the sensitivity of the hyperproliferative cells to apoptotic inducers, or other biological agents. Increases in intercellular signaling by elevating the number of GAP junctions would increase the anti-hyperproliferative effects on the neighboring hyperproliferative cell population. In other embodiments, cytostatic or differentiation agents can be used in combination with certain aspects of the present embodiments to improve the anti-hyperproliferative efficacy of the treatments. Inhibitors of cell adhesion are contemplated to improve the efficacy of the present embodiments. Examples of cell adhesion inhibitors are focal adhesion kinase (FAKs) inhibitors and Lovastatin. It is further contemplated that other agents that increase the sensitivity of a hyperproliferative cell to apoptosis, such as the antibody c225, could be used in combination with certain aspects of the present embodiments to improve the treatment efficacy.

III. EXAMPLES

The following examples are included to demonstrate preferred embodiments of the invention. It should be appreciated by those of skill in the art that the techniques disclosed in the examples which follow represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

Example 1—the Gut and Cervical Microbiome Promote Immune Activation and Response to Chemoradiation in Cervical Cancer A total of 30 patients were enrolled on this prospective, longitudinal study at two institutions. 70% of tumors were squamous carcinomas, 30% were adenocarcinoma. 16S rRNA sequencing was performed on fecal and cervical samples from all patients at four time points to characterize the diversity and composition of the microbiome at each of these sites over time. Additionally, T cell receptor sequencing was performed on tumor swabs in the majority of patients (n=25). Response to chemoradiation treatment (CRT) was assessed on Mill and clinical evaluation during exam under anesthesia at time of brachytherapy (week 5) as well as follow up PET/CT performed 3 months after completion of CRT (FIG. 1A).

Twenty-three percent of patients were categorized as exceptional responders (ER) based on complete tumor response at time of brachytherapy (week 5) on clinical exam and/or Mill and sustained response on follow up PET/CT (3 months). 17% patients were categorized as poor responders (PR) based on persistent disease at first follow up on clinical exam and/or PET/CT. The remaining 60% of patients were standard responders (SR) with residual disease at the time of brachytherapy but complete clinical and PET/CT response by 3 months. Response was not significantly associated with stage, histology, node level positivity, total dose, cycles of cisplatin, or antibiotic use (all p>0.05).

Figure 1B:
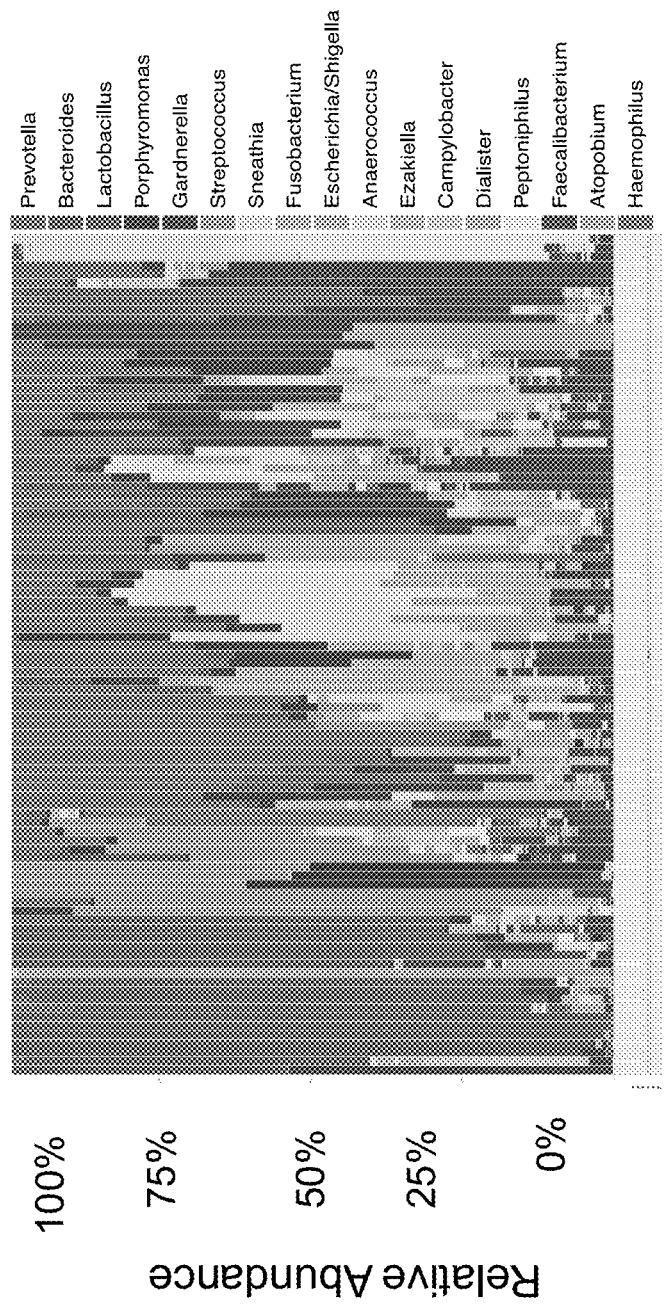
Figure 1C:
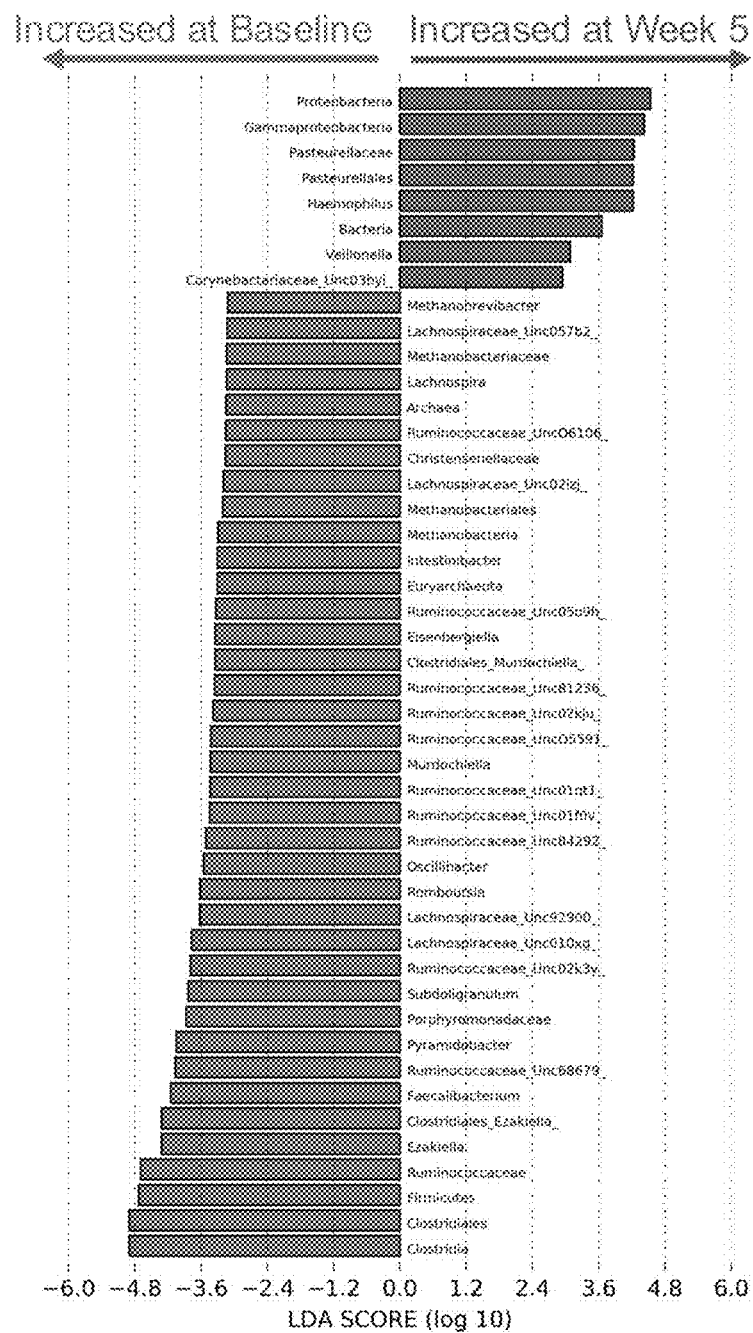

Presence of Cervical *Lactobacillus* Associated with Poor Clinical Response to Chemoradiation: Next, the impact of the local tumor microbiome on clinical response to CRT was evaluated. The diversity of the cervical microbiome was unchanged through the course of treatment (FIG. 1A). The genera with the highest relative abundances in all samples at all time points were prevotella (mean 14.6%), bacteroides (13.7%), lactobacillus (8.33%) and porphyromonas (4.57%) (FIG. 1B). LEFSe analysis revealed increased relative abundance of proteobacteria at week 5 over baseline and decreased relative abundance of clostridiales and firmicutes (FIG. 1C).

Figure 1D:
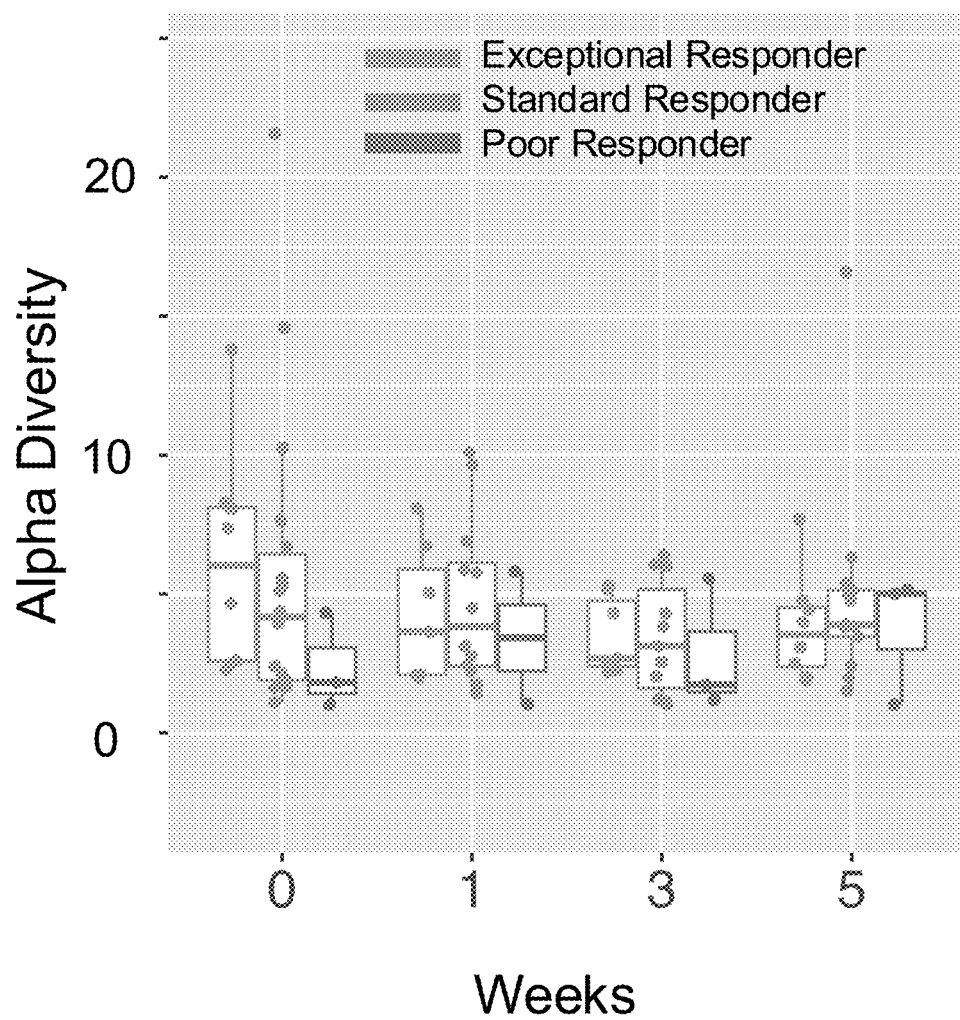
Figure 1E:
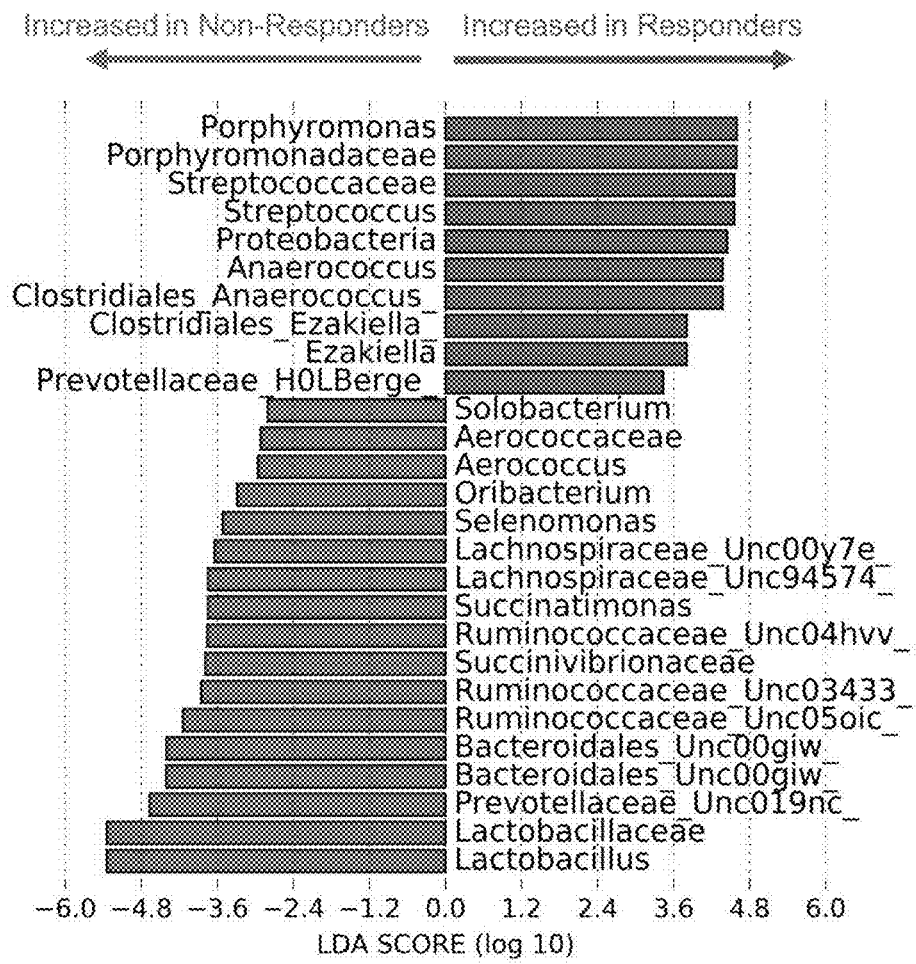
Figure 1F:
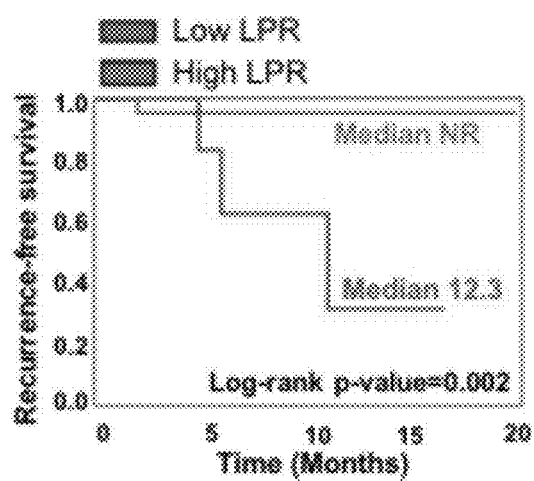

Alpha diversity of the cervical microbiome was not different among exceptional, standard and poor responders to treatment (FIG. 1D); however, on LEFSe analysis, strong genus-level differences existed between responders (SR/ER) and non-responders (PR), with enrichment of porphyromonas in SR/ER and enrichment of lactobacilli in PR (FIG. 1E). A lactobacillus:porphyromonas ratio (LPR) was calculated using all present *Lactobacillus* rarified OTU's and *Porphyromonas* OTU's, with a high LPR >=1 representing a *Lactobacillus*-predominant sample (N=7) and a low LPR <1 representing a more diverse sample without *Lactobacillus* dominance (N=23). A high LPR ratio was associated with decreased recurrence-free survival (RFS) (FIG. 3F; 12.3 months vs NR; p=0.002) and a failure rate of 43% (3/7) vs. 4% (1/23) noted in the low LPR group. In the murine model, vaginal 16s sequencing was also performed.

Figure 2:
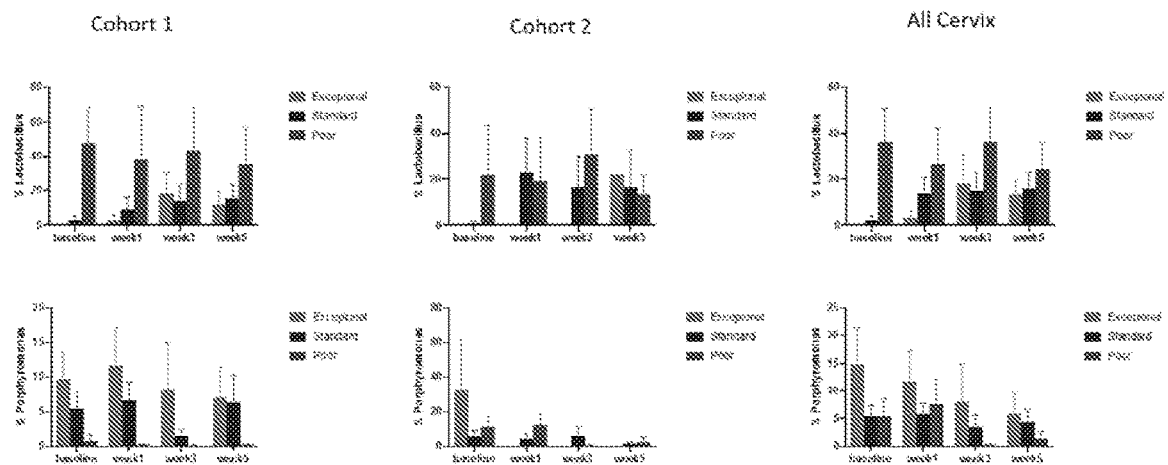
FIG. 2: Percentage of the cervical microbiome composed of *Lactobacillus* or *Porphyromonas* in the initial cohort, validation cohort and among all cervix patients.

A second cohort of 30 patients were enrolled in order to determine if *Lactobacillus* was similarly associated with poor response in this cohort. In this second cohort, *Lactobacillus* was significant higher in patients who went on to have a poor response to treatment (FIG. 2).

Figure 3:
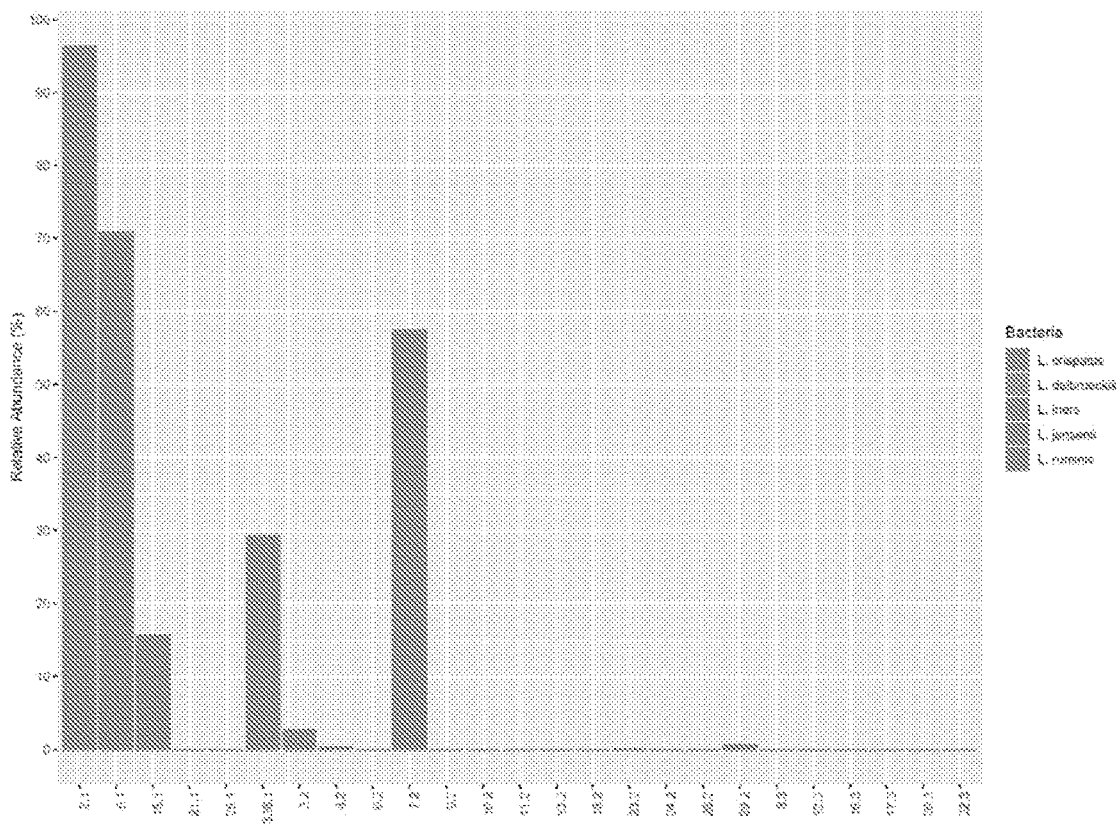
FIG. 3: Whole genome sequencing was performed to identify the *lactobacillus* species present in clinical samples.

To further refine the species of *Lactobacillus*, whole genome sequencing was performed. In all cases evaluated, *Lactobacillus inners* was identified as the dominate organism (FIG. 3).

Gut and Cervical Microbiome are Associated with Intratumoral Clonal T-cell Expansion: Given the role of the gut microbiome in generating immune activation, the relationship between the microbiome and clonal T-cell expansion was investigated within cervical cancers by performing serial TCR sequencing on tumor specimens. At baseline for all patients, total templates (FIG. 4A; p=0.22), sample clonality (FIG. 4B; p=0.3) and maximum productive frequency (MPF) (FIG. 4C; p=0.7) were similar among SR, ER and PR; however, by week 5, ER patients demonstrated higher clonality (FIG. 4E; ER median 0.05 [0.04-0.06] vs SR median 0.02 [0.01-0.03]; p=0.03) and higher MPF (FIG. 4F; ER median 0.02 [0.02-0.03] vs SR median 0.01 [0.009-0.02]; p=0.02). Total templates remained similar among all groups at week 5 (FIG. 2D; p=0.13).

Figures 4A, 4B, 4C, 4D, 4E, 4F, 4G, 4H, 4I, 4J, 4K:
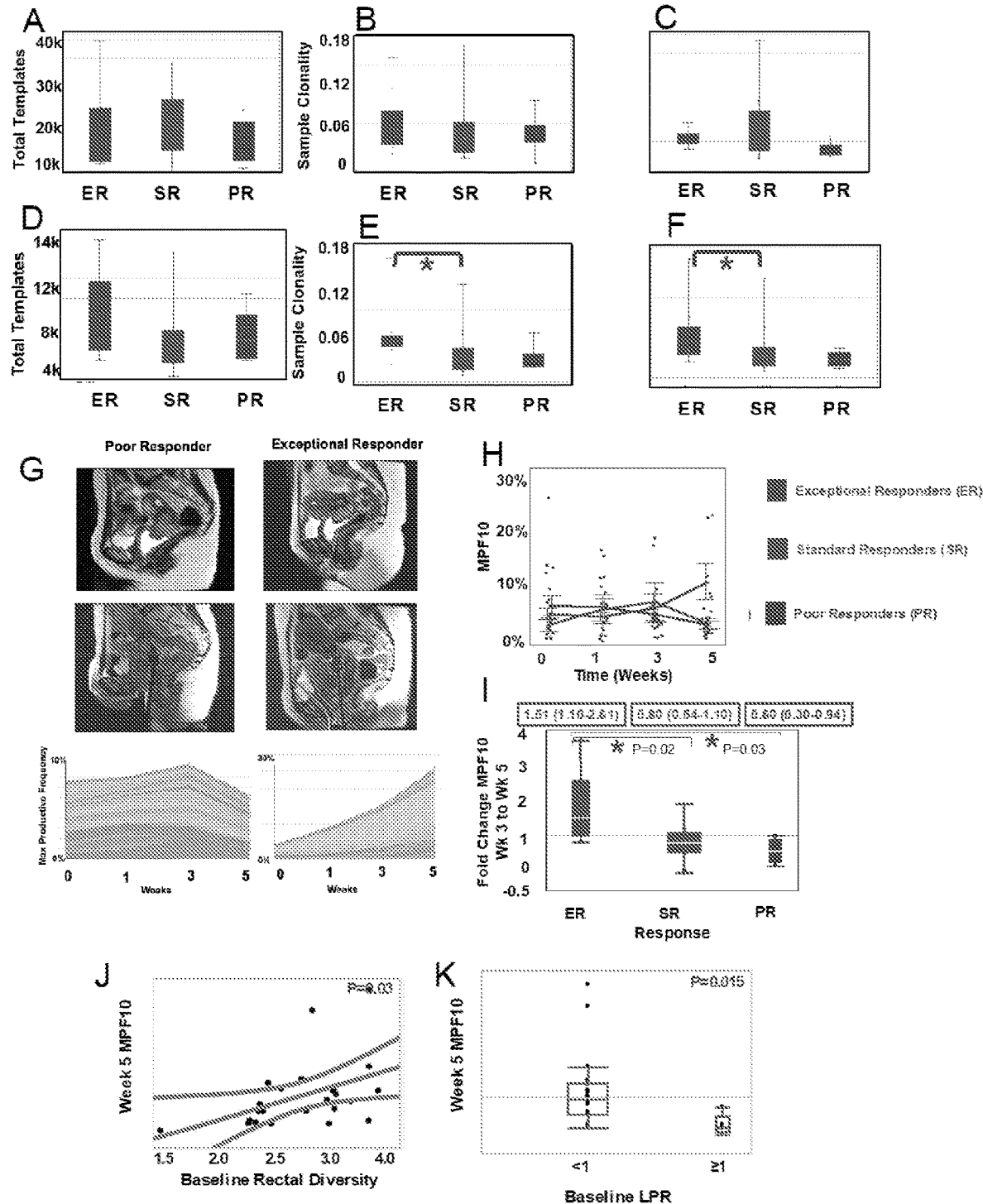
FIGS. 4A-4K: Oligoclonal expansion of intratumoral T-cells associated with cervical and gut microbiome. The total number of templates (FIG. 4A), T-cell clonality (FIG. 4B) and maximum productive frequency (FIG. 4C) at baseline for exceptional, standard and poor responders to chemoradiation, demonstrating no significant difference. The total number of T-cell templates (FIG. 4D) remained unchanged after 5 weeks of chemoradiation for exceptional, standard and poor responders to chemoradiation; however, T-cell clonality after 5 weeks of chemoradiation was significantly higher for exceptional responders with a median 0.05 [0.04-0.06] vs SR median 0.02 [0.01-0.03]; Dunn's adjusted p=0.03 (FIG. 4E). The maximum productive frequency of intratumoral T-cells exceptional, standard and poor responders after 5 weeks of chemoradiation (FIG. 4F). Representative T2 MR images of an exceptional responder and poor responder at baseline (FIG. 4G, upper panel) and week 5 (middle panel) of chemoradiation. The relative composition of the 10 most common clones at all time points is shown for the representative poor and exceptional responder, demonstrating clonal T-cell expansion in the exceptional responder (FIG. 4G, lower panel). Scatterplot for all patients demonstrating change in the productive frequency of the top 10 clones (MPF10) for exceptional as compared to standard and poor responders (FIG. 4I1), demonstrating clonal expansion by week 5. The overall fold change from week 3 to week 5 for exceptional, standard and poor responders demonstrating positive fold change for ER (1.51 [1.10-2.61]) vs PR (0.60 [0.30-0.94]; p=0.02) or SR (0.80 [0.54-1.10]; Wilcoxon p=0.03) (FIG. 4I). Linear regression of baseline gut microbiome diversity with intratumoral T-cell expansion after 5 weeks of chemoradiation (MPF10) demonstrating significant association (p=0.03). Intratumoral T-cell expansion (MPF10) after 5 weeks of chemoradiation for patients with high and low cervical LPR ratio at baseline demonstrating high LPR at baseline is associated with lower MPF10 at completion of treatment (Wilcoxon p=0.015) (FIG. 4J-4K).

The clonality metric accounts for all clones present, so in order to evaluate a subset of dominant clones, the maximum productive frequencies of the most frequent clones at each time point for each patient was calculated. Examples of dynamic changes in the most frequent clones for representative patients with a poor and exceptional response to treatment are shown in FIG. 4G. T2 weighted MRI images at baseline and after 5 weeks of treatments demonstrate a poor response to treatment with persistent tumor seen at the time of brachytherapy, as compared to the exceptional responder who had no measurable tumor after 5 weeks of chemoradiation. The profile of the most common clones was unchanged over the course of radiation for the representative poor responder (lower left panel of FIG. 4G) while the exceptional responder developed a dominate T-cell clone over the course of radiation treatment (lower right panel of FIG. 4G). For all patients, the percentage of the TCR repertoire composed of the 10 most dominant clones (MPF10) decreased over the course of treatment for PR/SR and increased over time for ER (FIG. 2H). These changes were most notable at the end of treatment where there was a higher fold change (FIG. 2I) in MPF10 from week 3 to week 5 for ER (1.51 [1.10-2.61]) vs PR (0.60 [0.30-0.94]; p=0.02) or SR (0.80 [0.54-1.10]; p=0.03).

Next, baseline gut microbiome diversity was compared with the capacity to clonally expand intratumoral T-cells. Patients with a diverse gut microbiome were more likely to have a higher MPF10 at the end of treatment (FIG. 4J; p=0.03), suggesting that overall diversity of the intestinal microbiome supports generation of antigen specific immunity during radiation therapy.

To investigate the impact of the local tumor microbiome on T-cell expansion, MFP10 at week 5 was compared for patients with higher and lower lactobacillus composition. Lower LPR at baseline was associated with increased MPF10 by week 5 (FIG. 4K; p=0.015). These findings suggest that the presence of lactobacillus may suppress local tumor immunity.

Figures 5A, 5B, 5C, 5D, 5E:
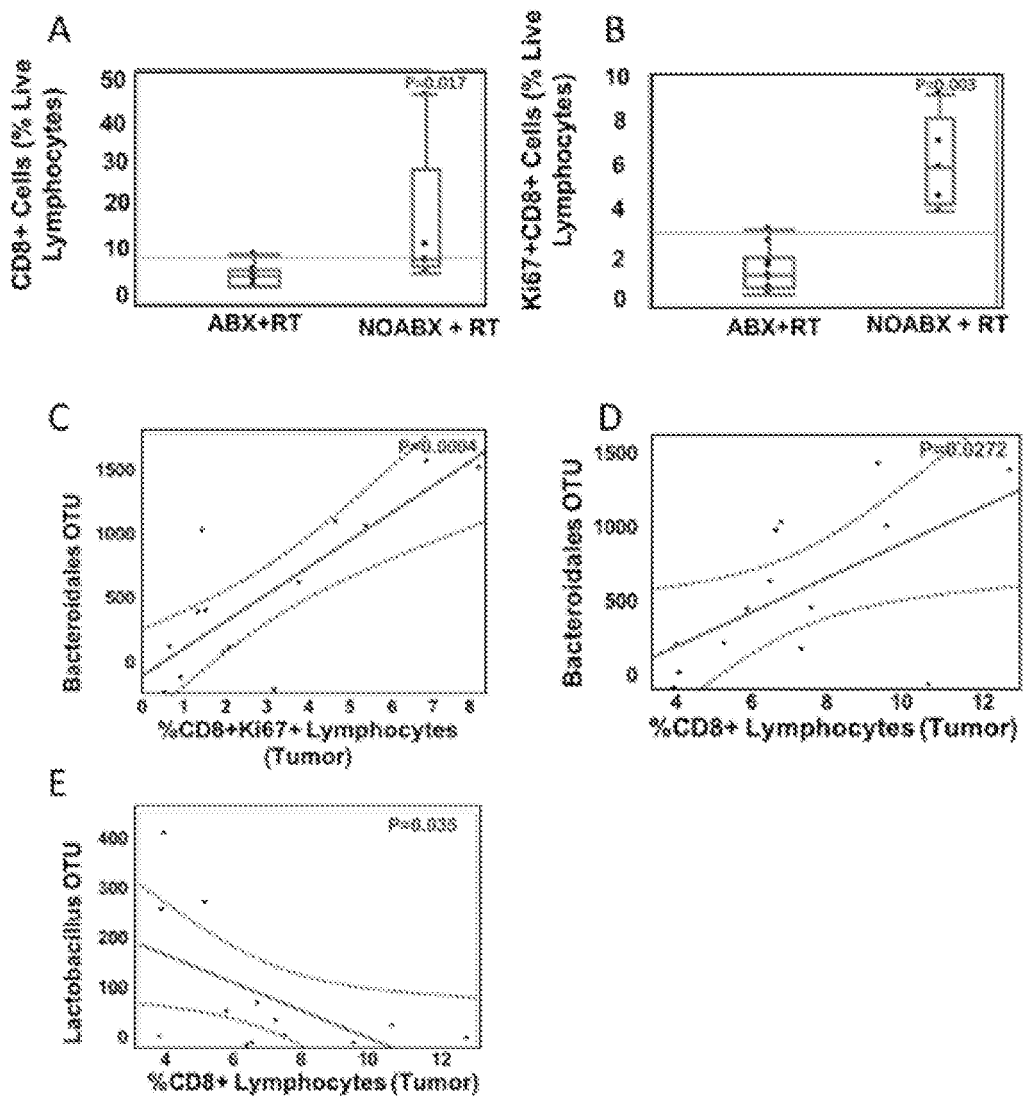
FIGS. 5A-5E: Associated of vaginal and gut microbiome with intratumoral immune activation in murine HPV model of HPV cancer. ABX and NOABX mice were sacrificed 11 days post-RT. Tumors cells were stained and fixed for multiparametric flow cytometry (MPFC) for $CD8^+$ and Ki67 to identify infiltrating proliferative effector T-cells. The percentage of intratumoral effector T-cell ($CD8^+$) from NOABX mice were significantly higher than for ABX mice (Wilcoxon p-0.017) (FIG. 5A). The percentage of $CD8^+$ T-cell expressing Ki67 within tumors was also higher compared for NOABX mice compared to ABX mice (Wilcoxon p=0.003) (FIG. 5B). The presence of Bacteroidales OTU correlates with the number of intratumoral $CD8^+$ T-cells (FIG. 5C) and $Ki67^+$ $CD8^+$ T-cells (FIG. 5D). Higher number of lactobacillus OTU's in vaginal tumors was also associated with lower percentages of tumor infiltrating CD8% T-cells (p=0.035) (FIG. 5E).

Intestinal Diversity and Lower Levels of *Lactobacillus* Associated with Increased Effector T-cell infiltration in Murine HPV Cancers after Radiation Treatment: To determine if microbiota was associated with immune activation in an orthotopic murine model of HPV cancers, TC-1 tumors were analyzed after RT with flow cytometry for infiltrating and proliferative $CD8^+$ T-cells. Overall tumor $CD8^+$ percentages (FIG. 5A) were higher in mice with greater gut diversity (NOABX) as compared to mice with lower diversity (ABX) (Median 5.91 vs 9.37; p=0.017). Higher percentages of $CD8^+$ T-cells expressed the proliferation marker Ki67 (FIG. 5B; 1.43 vs 6.61; p=0.003), suggesting that mice with a richer gut microbiome have improved T-cell proliferation after RT. Correlation of the top 10 most common organisms in mouse gut intestinal microbiome demonstrated that Bacteriodales OTU correlated with the presence (FIG. 5C) of $CD8^+$ T-cell and Ki67+ intratumoral $CD8^+$ T-cells (FIG. 5D).

To determine if cervical lactobacillus was associated with immune activation in mice, vaginal microbiota was sampled at the time of RT. Treatment with antibiotics modestly reduced the diversity of the cervical microbiota (p=0.04). The presence of increased abundance of *Lactobacillus* OTU's in mice was also associated with a decreased percentage of $CD8^+$ intratumoral T-cells (p=0.03) (FIG. 5E).

In conclusion, this study provides the first evidence that generation of antigen-specific immune response is a feature of radiation sensitive HPV cancers, utilizing both clinical samples and an orthotopic mouse model of HPV cancers. It was found that cervical cancer lactobacillus was associated with lower relapse free survival and a diminished T-cell response. These findings suggest new strategies to improve outcomes in cervical cancer by manipulating the intestinal and cervical microbiomes.

Example 2—Materials and Methods

TABLE 1

Materials.

| REAGENT or RESOURCE | SOURCE | IDENTIFIER |
|---|---|---|
| Antibodies | | |
| CD3 Rat Anti-Mouse (Clone: 17A2) | BD Horizon | Cat#: 564380 |
| CD4 Rat Anti-Mouse (Clone: RM4-5) | BD Horizon | Cat#: 563151 |
| CD8a Rat Anti-Mouse (Clone: 53-6.7) | BD Horizon | Cat#: 563234 |
| FoxP3 Rat Anti-Mouse (Clone: FJK-16s) | eBioscience | Ref#: 61-5773-82 |
| E7 Tetramer | Baylor College of Medicine | 17020 APC |
| Ki67 Anti Mouse (Clone: B56) | BD Pharmigen | Cat#: 561284 |
| PD-1 Anti-Mouse CD279 (Clone: RMP1-30) | eBioscience | Ref#: 11-9981-82 |
| Biological Samples | | |
| Human Tumor Sampling - Cytobrush | The University of Texas MD Anderson Cancer Center, Houston, TX | Protocol 2014-0543 |

TABLE 1-continued

Materials.

| REAGENT or RESOURCE | SOURCE | IDENTIFIER |
|---|---|---|
| Chemicals, Peptides, and Recombinant Proteins | | |
| Neomycin | Alfa Aesar | Cat#: J67011 |
| Vancomycin | Hospira | NDC#: 0409-4332-01 |
| Imipenem/Cilistatin | Hospira | NDC#: 63323-349-25 |
| Deposited Data | | |
| Experimental Models: Cell Lines | | |
| TC-1 | T.-C. WU and C. Hung of Johns Hopkins School of Medicine, Baltimore Bartkowiak et al. | N/A |
| Experimental Models: Organisms/Strains | | |
| Mouse: C57BL/6J | The Jackson Laboratory | |
| Software and Algorithms | | |
| ATIMA (Agile Toolkit for Incisive Microbial Analyses) | R Studio | |
| Galaxy: LEfSe | Segata et. al 2010 | |
| Other (Resources) | | |
| FlowJo | FlowJo Software | |
| GraphPad Prism | GraphPad Software | |
| JMP | SAS | |
| Living Image Software | IVIS Spectrum - Perkin Elmer | Part #128113 |

Patient Population: IRB approval was obtained for this protocol (MDACC 2014-0543). 17 patients were enrolled from The University of Texas MD Anderson Cancer Center and 13 from Harris Health System, Lyndon B. Johnson General Hospital Oncology Clinic. 70% of tumors were squamous carcinomas, 30% were adenocarcinoma. 10%, 20%, 7%, 43%, 13% and 7% of tumors were FIGO stage IB1, IB2, IIA, IIB, IIIB and IVA respectively. Patients received a minimum of 45Gy of external beam radiation therapy (EBRT) in 25 fractions over 5 weeks with weekly cisplatin, followed by two brachytherapy treatments at approximately week 5 and week 7 with EBRT between brachytherapy treatments for gross nodal disease or persistent disease in the parametrium. Stage IB1 patients were treated with CRT due to nodal disease. Median follow up was 13.95 months. 13 patients completed all swabs at all time points. Complete 16SGS was performed for a total of 30 patients. Complete TCR sequencing was performed for 25 of these patients.

Clinical Efficacy Analysis: Response to radiation was monitored using clinical exam through the course of treatment, week 5 MRI and month 3 PET/CT.

Mice: Six week old female C57BL/6 wild type mice were purchased from Jackson Laboratories. Animal experiments were conducted according to MD Anderson Institutional Animal Care and Use Committee-approved protocol. All mice were housed and treated in accordance with institutional standards.

Cell Line: A C57BL/6 mouse lung epithelial cancer cell line transformed with E6 and E7 oncogenes of HPV-16 and Ras oncogene was provided as a gift from T.-C. Wu and C. Hung (Johns Hopkins School of Medicine, Baltimore). The cell line also expresses firefly luciferase.

Cells were cultured in 1640 RPMI (Corning) with 10% FBS, 1% penicillin/streptomycin and 50 ug/mL gentamycin.

16S rRNA Sequencing: Patient cervical and rectal swabs were obtained using Isohelix swabs as described above were placed in 20 µL of protease K and 400 µL of lysis buffer (Isohelix) and stored at −80° C. within 1 hour of sample collection. Mouse fecal pellets and vaginal swabs (Puritan sterile polyester tipped applicator swabs) were collected at baseline, prior to XRAD treatment, and at sacrifice. Fecal pellets were flash frozen and stored at −80° C. Mouse vaginal swabs were treated as above.

16S rRNA gene sequencing was performed by personnel of the Alkek Center for Metagenomics and Microbiome Research at Baylor College of Medicine. 16S rRNA was sequenced using methods adapted from the methods used for the Human Microbiome Project (11,12). Briefly, bacterial genomic DNA was extracted using MO BIO PowerSoil DNA Isolation Kit (MO BIO Laboratories). The 16S rDNA V4 region was amplified by PCR and sequenced on the MiSeq platform (Illumina) using the 2×250 bp paired-end protocol, yielding pair-end reads that overlapped almost completely. The primers used for amplification contain adapters for MiSeq sequencing and single-end barcodes allowing pooling and direct sequencing of PCR products (12).

The 16S rRNA gene data incorporate phylogenetic-based and alignment-based approaches to maximize data resolution. Sequence read pairs were demultiplexed using unique molecular barcodes, and reads were merged using USEARCH version 7.0.1090 (4). 16S analysis was performed using custom analytic packages and pipelines developed at the Alkek Center for Metagenomics and Microbiome Research at Baylor University to create summary statistics and quality control measurements for each sequencing run, as well as multi-run reports and data-merging capabilities for validating built-in controls and characterizing microbial communities across large numbers of samples or sample groups.

16S rRNA gene sequences were clustered into OTUs at a similarity cutoff value of 97% using the UPARSE algorithm. OTUs were mapped to an optimized version of the SILVA rRNA database with the 16S v4 region to generate taxonomies. Abundances were determined by mapping the demultiplexed reads to the UPARSE OTUs. A custom script was used to construct an OTU table from the output files generated as described above for downstream analyses of alpha-diversity, beta-diversity, and phylogenetic trends.

T-cell receptor sequencing: DNA was extracted from cervical samples using Isohelix protocol DSK-50. Multiplex PCR-based deep sequencing of the CDR3 region of the T-cell receptor β was performed using the proprietary ImmunoSEQ immune profiling system13 (Adaptive Biotechnologies). This technique uses a library of known forward primers, each specific to a T-cell receptor Vβ segment, and reverse primers specific to a T-cell receptor Jβ segment. Both productive templates and nonproductive templates (CDR3 regions predicting out-of-frame receptor gene or premature stop) were analyzed, but productive templates were used for this analysis.

Administration of Antibiotics: A cocktail of antibiotics (lg/L Neomycin, 500 mg/L Vancomycin, 500 mg/L imipenem/cilistatin) was placed in the drinking water of mice three weeks prior to tumor challenge. Water was changed every other day due to the half-life of imipenem. Antibiotics were purchased from the following companies: Neomycin (Alfa Aesar), Vancomycin (Hospira), Imipenem/cilistatin (Hospira)

Intravaginal Tumor Challenge: $3 \times 10^5$ TC-1 cells were placed in the vaginal canal of Xylazine/Ketamine anesthetized mice according to a previous protocol (Decrausaz et al). Briefly, mice were treated with subcutaneous injection of Medroxyprogesterone and Estradiol for di-estrus synchronization one week prior to tumor implantation. Estrus synchronization was confirmed by presence of leukocytes in cytology smear. 24 hours prior to tumor challenge, Xylazine/Ketamine anesthetized mice were treated to Nonoxynol-9 (Abcam biochemical) instilled in the vaginal canal.

IVIS Imaging: Tumors were visualized twice a week using a Xenogen IVIS System. Tumor growth was monitored using GraphPad Prism XRAD Treatment: Once tumors had reached a previously set threshold ($1\times10^7$-$2\times10^7$ photons/sec), mice were treated with 6Gy radiation using CT guided radiation delivered via an XRAD 225Cx irradiator. Radiation fields were set using a 25 mm collimator to minimize radiation dose to surrounding tissues.

Sacrifice: Mice were sacrificed 11-days post radiation therapy. Axial, Inguinal, and Iliac lymph nodes, along with the spleen, and tumor were collected and placed in 1×HBSS (Corning). Lymph nodes and spleen were macerated and passed through a 40 um strainer and washed in 1×HBSS. Tumors were macerated, incubated shaking with Collagenase (Worthington Biochemical) at 37 C for one hour, treated to Red Blood Cell Lysis (Thermo Fisher), passed through 40 um strainer and washed with FACS.

Flow Cytometry: Immunostaining of lymphocytes was performed according to standard protocols. Cells were fixed using the Foxp3/Transcription Factor Staining Buffer Set (eBioscience) and stained with a 16 color panel with antibodies from Biolegend, BD Bioscience, eBioscience, and Life Technologies. Analysis was performed on a 5-laser, 18 color LSRFortessa X-20 Flow Cytometer (BD Biosciences). Analysis was performed on Flowjo Software (INFO).

Briefly, cells were stained with intracellular mAB for 30 minutes at 4 C in the presence of anti-Cd16/Cd32 mAB (BD Bioscience), fixed with Foxp3/Transcription Factor Staining Buffer Set (eBioscience), and held in FACS (Corning, 2 mM EDTA, 2% FBS). Counting beads (Thermo Fisher) were used for single color controls.

Quantification and statistical analysis: For Microbiome Analysis, rarefaction depth was set at 4,070 reads for vaginal samples and 7.094 reads for rectal samples. Both Shannon diversity index (SDI) and Inverse Simpson diversity metric (ISD) were used to evaluate alpha diversity with similar findings, although ISD is presented in this manuscript for simplicity. Wilcoxon rank-sum test was used to compare SDI between patient groups and paired Wilcoxon test was used to compare across time points. Mixed model was generated to incorporate interactions with time. Beta diversity was analyzed using Linear Discriminant Analysis Effect Size (LEfSe) analysis was performed using Galaxy software from the Huttenhower lab for differences in relative abundances. Alpha thresholds for pairwise tests were set at 0.05 and threshold on logarithmic score was set to 2.0.

For TCR analysis, Dunn's test was used to calculate differences between the three groups and p-values were adjusted for multiple testing.

All of the methods disclosed and claimed herein can be made and executed without undue experimentation in light of the present disclosure. While the compositions and methods of this invention have been described in terms of preferred embodiments, it will be apparent to those of skill in the art that variations may be applied to the methods and in the steps or in the sequence of steps of the method described herein without departing from the concept, spirit and scope of the invention. More specifically, it will be apparent that certain agents which are both chemically and physiologically related may be substituted for the agents described herein while the same or similar results would be achieved. All such similar substitutes and modifications apparent to those skilled in the art are deemed to be within the spirit, scope and concept of the invention as defined by the appended claims.

REFERENCES

The following references, to the extent that they provide exemplary procedural or other details supplementary to those set forth herein, are specifically incorporated herein by reference.

Gopalakrishnan, V., et al., *Gut microbiome modulates response to anti-PD-1 immunotherapy in melanoma patients*. Science, 2018. 359(6371): p. 97-103.

Matson, V., et al., *The commensal microbiome is associated with anti-PD-1 efficacy in metastatic melanoma patients*. Science, 2018. 359(6371): p. 104-108.

Routy, B., et al., *Gut microbiome influences efficacy of PD-1-based immunotherapy against epithelial tumors*. Science, 2018. 359(6371): p. 91-97.

Fransen, F., et al., *BALB/c and C57BL/6 Mice Differ in Polyreactive IgA Abundance, which Impacts the Generation of Antigen-Specific IgA and Microbiota Diversity*. Immunity, 2015. 43(3): p. 527-40.

Rescigno, M., *A 'fit' microbiota to potentiate cancer immunotherapy*. Genome Med, 2015. 7: p. 131.

Sonnenberg, G. F. and D. Artis, *Innate lymphoid cell interactions with microbiota: implications for intestinal health and disease*. Immunity, 2012. 37(4): p. 601-10.

Iida, N., et al., *Commensal bacteria control cancer response to therapy by modulating the tumor microenvironment*. Science, 2013. 342(6161): p. 967-70.

Viaud, S., et al., *The intestinal microbiota modulates the anticancer immune effects of cyclophosphamide*. Science, 2013. 342(6161): p. 971-6.

Ferlay, J., et al., *Cancer incidence and mortality worldwide: sources, methods and major patterns in GLOBOCAN 2012*. Int J Cancer, 2015. 136(5): p. E359-86.

Yuh, W. T., et al., *Predicting control of primary tumor and survival by DCEMRI during early therapy in cervical cancer*. Invest Radiol, 2009. 44(6): p. 343-50.

Li, W. W., et al., *Sustained-release endotoxin. A model for inducing corneal neovascularization*. Invest Ophthalmol Vis Sci, 1991. 32(11): p. 2906-11.

Goto, T., et al., *Endotoxin levels in sera of elderly individuals*. Clin Diagn Lab Immunol, 1994. 1(6): p. 684-8.

Mattsby-Baltzer, I., et al., *Endotoxin is angiogenic*. Int J Exp Pathol, 1994. 75(3): p. 191-6.

Harmey, J. H., et al., *Lipopolysaccharide-induced metastatic growth is associated with increased angiogenesis, vascular permeability and tumor cell invasion*. Int J Cancer, 2002. 101(5): p. 415-22.

Glukhov, I. L., N. P. Sirota, and E. A. Kuznetsova, *DNA damage in human mononuclear cells induced by bacterial endotoxin*. Bull Exp Biol Med, 2008. 146(3): p. 301-3.

Didierlaurent, A., et al., *Attenuated poxviruses expressing a synthetic HIV protein stimulate HLA-A2-restricted cytotoxic T-cell responses*. Vaccine, 2004. 22(25-26): p. 3395-403.

Didierlaurent, A., et al., *Flagellin promotes myeloid differentiation factor 88-dependent development of Th2-type response*. J Immunol, 2004. 172(11): p. 6922-30.

Rieber, N., et al., *Flagellin induces myeloid-derived suppressor cells: implications for Pseudomonas aeruginosa infection in cystic fibrosis lung disease.* J Immunol, 2013. 190(3): p. 1276-84.

Round, J. L. and S. K. Mazmanian, *Inducible Foxp3+ regulatory T-cell development by a commensal bacterium of the intestinal microbiota.* Proc Natl Acad Sci USA, 2010. 107(27): p. 12204-9.

Round, J. L., R. M. O'Connell, and S. K. Mazmanian, *Coordination of tolerogenic immune responses by the commensal microbiota.* J Autoimmun, 2010. 34(3): p. J220-5.

Telesford, K. M., et al., *A commensal symbiotic factor derived from Bacteroides fragilis promotes human CD39 (+)Foxp3(+) T cells and Treg function.* Gut Microbes, 2015. 6(4): p. 234-42.

Usami, M., et al., *Butyrate and trichostatin A attenuate nuclear factor kappaB activation and tumor necrosis factor alpha secretion and increase prostaglandin E2 secretion in human peripheral blood mononuclear cells.* Nutr Res, 2008. 28(5): p. 321-8.

Willemsen, L. E., et al., *Short chain fatty acids stimulate epithelial mucin 2 expression through differential effects on prostaglandin E(1) and E(2) production by intestinal myofibroblasts.* Gut, 2003. 52(10): p. 1442-7.

Smith, P. M., et al., *The microbial metabolites, short-chain fatty acids, regulate colonic Treg cell homeostasis.* Science, 2013. 341(6145): p. 569-73.

Furusawa, Y., et al., *Pitfalls in global normalization of ChIP-seq data in CD4(+) T cells treated with butyrate: A possible solution strategy.* Genom Data, 2014. 2: p. 176-80.

Furusawa, Y., et al., *Commensal microbe-derived butyrate induces the differentiation of colonic regulatory T cells.* Nature, 2013. 504(7480): p. 446-50.

Arpaia, N., et al., *Metabolites produced by commensal bacteria promote peripheral regulatory T-cell generation.* Nature, 2013. 504(7480): p. 451-5.

Arpaia, N. and A. Y. Rudensky, *Microbial metabolites control gut inflammatory responses.* Proc Natl Acad Sci USA, 2014. 111(6): p. 2058-9.

Zimmerman, M. A., et al., *Butyrate suppresses colonic inflammation through HDAC1-dependent Fas upregulation and Fas-mediated apoptosis of T cells.* Am J Physiol Gastrointest Liver Physiol, 2012. 302(12): p. G1405-15.

Cox, M. A., et al., *Short-chain fatty acids act as antiinflammatory mediators by regulating prostaglandin E(2) and cytokines.* World J Gastroenterol, 2009. 15(44): p. 5549-57.

Bonnotte, B., et al., *Cancer cell sensitization to fas-mediated apoptosis by sodium butyrate.* Cell Death Differ, 1998. 5(6): p. 480-7.

Fung, K. Y., et al., *Butyrate-induced apoptosis in HCT116 colorectal cancer cells includes induction of a cell stress response.* J Proteome Res, 2011. 10(4): p. 1860-9.

Fung, K. Y., et al., *A combined free-flow electrophoresis and DIGE approach to identify proteins regulated by butyrate in HT29 cells.* Proteomics, 2011. 11(5): p. 964-71.

Hinnebusch, B. F., et al., *The effects of short-chain fatty acids on human colon cancer cell phenotype are associated with histone hyperacetylation.* J Nutr, 2002. 132(5): p. 1012-7.

Kim, E. H., et al., *Roscovitine sensitizes glioma cells to TRAIL-mediated apoptosis by downregulation of survivin and XIAP.* Oncogene, 2004. 23(2): p. 446-56.

Kim, S., et al., *Phosphatidylinositol 3-kinase inhibition down-regulates survivin and facilitates TRAIL-mediated apoptosis in neuroblastomas.* J Pediatr Surg, 2004. 39(4): p. 516-21.

Kim, Y. H., et al., *Sodium butyrate sensitizes TRAIL-mediated apoptosis by induction of transcription from the DR5 gene promoter through Sp1 sites in colon cancer cells.* Carcinogenesis, 2004. 25(10): p. 1813-20.

Maruyama, T., et al., *Apoptosis of bladder cancer by sodium butyrate and cisplatin.* J Infect Chemother, 2012. 18(3): p. 288-95.

Qiu, J., Z. Gao, and H. Shima, *Growth of human prostate cancer cells is significantly suppressed in vitro with sodium butyrate through apoptosis.* Oncol Rep, 2012. 27(1): p. 160-7.

Gaudet, R. G., et al., *INNATE IMMUNITY. Cytosolic detection of the bacterial metabolite HBP activates TIFA-dependent innate immunity.* Science, 2015. 348(6240): p. 1251-5.

Fallarino, F., et al., *Tryptophan catabolism generates autoimmune preventive regulatory T cells.* Transpl Immunol, 2006. 17(1): p. 58-60.

Romani, L., et al., *Thymosin alpha1 activates dendritic cell tryptophan catabolism and establishes a regulatory environment for balance of inflammation and tolerance.* Blood, 2006. 108(7): p. 2265-74.

Fallarino, F., et al., *The combined effects of tryptophan starvation and tryptophan catabolites down-regulate T cell receptor zeta-chain and induce a regulatory phenotype in naive T cells.* J Immunol, 2006. 176(11): p. 6752-61.

Montagnoli, C., et al., *Immunity and tolerance to Aspergillus involve functionally distinct regulatory T cells and tryptophan catabolism.* J Immunol, 2006. 176(3): p. 1712-23.

Fallarino, F. and P. Puccetti, *Toll-like receptor 9-mediated induction of the immunosuppressive pathway of tryptophan catabolism.* Eur J Immunol, 2006. 36(1): p. 8-11

Kostic, A. D., et al., *Fusobacterium nucleatum potentiates intestinal tumorigenesis and modulates the tumor-immune microenvironment.* Cell Host Microbe, 2013. 14(2): p. 207-15.

Motevaseli, E., et al., *The Effect of Lactobacillus crispatus and Lactobacillus rhamnosusCulture Supernatants on Expression of Autophagy Genes and HPV E6 and E7 Oncogenes in The HeLa Cell Line.* Cell J, 2016. 17(4): p. 601-7.

Wang, K. D., et al., *Inhibitory Effect of Vaginal Lactobacillus Supernatants on Cervical Cancer Cells.* Probiotics Antimicrob Proteins, 2018. 10(2): p. 236-242.

Guerrero-Preston, R., et al., *High-resolution microbiome profiling uncovers Fusobacterium nucleatum, Lactobacillus gasseri/johnsonii, and Lactobacillus vaginalis associated to oral and oropharyngeal cancer in saliva from HPV positive and HPV negative patients treated with surgery and chemo-radiation.* Oncotarget, 2017. 8(67): p. 110931-110948.

What is claimed is:

1. A method of treating an HPV cancer in a subject comprising: (a) determining the relative abundance of *Lactobacillus iners* in the subject, wherein an enriched abundance of *Lactobacillus iners* as compared to a total abundance of bacteria in a sample from the subject, identifies the subject as having decreased radiation response; and (b) administering an effective amount of a probiotic to reduce the level of *Lactobacillus iners* in the subject in combination with an anti-cancer therapy.

2. The method of claim 1, wherein the presence of *Lactobacillus iners* is detected in fecal sample, blood sample, skin swab, cervical swab or mucosa sample from the subject.

3. The method of claim 1, wherein the presence of *Lactobacillus iners* is detected in a cervical mucosa sample.

4. The method of claim 1, wherein the presence of *Lactobacillus iners* is detected by sequencing or PCR of 16S rRNA.

5. The method of claim 1, wherein the HPV cancer is ovarian cancer or cervical cancer.

6. The method of claim 1, wherein the subject has a squamous carcinoma or an adenocarcinoma.

7. The method of claim 1, wherein the subject is positive for HPV.

8. The method of claim 1, wherein the probiotic is free of *Lactobacillus iners*.

9. The method of claim 1, wherein the probiotic comprises non-*iners Lactobacillus* species.

10. The method of claim 1, wherein the probiotic comprises *Prevotella, Bacteroides* and/or Porphyromonas species.

11. The method of claim 1, wherein the probiotic is applied to the site where the presence of *Lactobacillus iners* was detected.

12. The method of claim 1, wherein the subject is treated with an antibiotic.

13. The method of claim 12, wherein the bacteria in the probiotic is resistant to the antibiotic.

14. The method of claim 12, further comprising collecting a sample from the subject after administering the probiotic or antibiotic and testing the sample for *Lactobacillus iners*.

15. The method of claim 1, wherein the anticancer therapy comprises chemotherapy, radiation and/or immunotherapy.

16. The method of claim 1, wherein the enriched abundance of *Lactobacillus iners* is determined in comparison to the abundance of *Porphyromonas* in said subject, wherein a high *Lactobacillus* to *Porphyromonas* ratio identifies the subject as having a decreased radiation response and recurrence-free survival.

17. The method of claim 1, wherein probiotic is administered prior to the anticancer therapy.

* * * * *